(12) United States Patent
Arabi et al.

(10) Patent No.: US 10,920,982 B2
(45) Date of Patent: Feb. 16, 2021

(54) BURNER MONITORING AND CONTROL SYSTEMS

(71) Applicant: Schlumberger Technology Corporation, Sugar Land, TX (US)

(72) Inventors: Hakim Arabi, Katy, TX (US); Diogo Piasseski, Clamart (FR); Francis Dominique Allouche, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 222 days.

(21) Appl. No.: 15/762,571

(22) PCT Filed: Sep. 28, 2016

(86) PCT No.: PCT/US2016/054041
§ 371 (c)(1),
(2) Date: Mar. 23, 2018

(87) PCT Pub. No.: WO2017/058832
PCT Pub. Date: Apr. 6, 2017

(65) Prior Publication Data
US 2018/0266680 A1    Sep. 20, 2018

(30) Foreign Application Priority Data

Sep. 28, 2015  (EP) .................................... 15290246
Jun. 28, 2016  (EP) .................................... 16290117

(51) Int. Cl.
*F23G 7/08*    (2006.01)
*F23N 5/08*    (2006.01)
*G01J 5/00*    (2006.01)

(52) U.S. Cl.
CPC ................. *F23G 7/08* (2013.01); *F23N 5/08* (2013.01); *F23N 5/082* (2013.01); *G01J 5/0018* (2013.01);
(Continued)

(58) Field of Classification Search
CPC .......... F23N 5/08; F23N 5/082; G01J 5/0018
See application file for complete search history.

(56) References Cited

U.S. PATENT DOCUMENTS 3,658,015 A    4/1972  Griffin, III et al.
3,816,059 A    6/1974  Straitz, III
(Continued)

FOREIGN PATENT DOCUMENTS

CA    2808707 A1    5/2013
WO    WO20100147496 A1    12/2010
(Continued)

OTHER PUBLICATIONS

Exam report issued in the related EP Patent Application No. 16784620.3 dated Mar. 5, 2020, 6 pages.
(Continued)

*Primary Examiner* — Santiago Garcia

(57) ABSTRACT

Systems and methods for monitoring and controlling burning operations are provided. A method of one embodiment includes igniting oil or gas with a burner (282) during a burning operation and monitoring the burning operation with a camera (290). This monitoring of the burning operation can include acquiring image data for a flame (290) of the burner via the camera and analyzing the acquired image data to detect image features indicative of combustion of the oil or gas via the burner. Additional systems, methods, and devices are also disclosed.

18 Claims, 16 Drawing Sheets

(52) U.S. Cl.
CPC .... *F23G 2207/10* (2013.01); *F23G 2209/102* (2013.01); *F23G 2209/141* (2013.01); *F23N 2223/48* (2020.01); *F23N 2229/20* (2020.01); *G01J 2005/0077* (2013.01)

(56) References Cited

U.S. PATENT DOCUMENTS

| | | | |
|---|---|---|---|
| 3,875,998 | A | 4/1975 | Charpentier |
| 3,913,560 | A | 10/1975 | Lazarre et al. |
| 4,059,385 | A | 11/1977 | Gulitz et al. |
| 4,092,095 | A | 5/1978 | Straitz, III |
| 4,255,120 | A | 3/1981 | Straitz, III |
| 4,268,245 | A | 5/1981 | Straitz, III |
| 4,482,364 | A | 11/1984 | Martin et al. |
| 4,505,668 | A | 3/1985 | DiBiano et al. |
| 4,516,932 | A | 5/1985 | Chaudot |
| 4,614,491 | A | 9/1986 | Welden |
| 4,636,934 | A | 1/1987 | Schwendemann et al. |
| 4,652,233 | A | 3/1987 | Hamazaki et al. |
| 4,749,122 | A | 6/1988 | Shriver et al. |
| 4,871,307 | A | 10/1989 | Harris et al. |
| 4,913,647 | A | 4/1990 | Bonne et al. |
| 4,942,772 | A | 7/1990 | Welker |
| 4,961,703 | A | 10/1990 | Morgan |
| 5,197,826 | A | 3/1993 | Korloo |
| 5,231,939 | A | 8/1993 | Tanaka et al. |
| 5,275,553 | A | 1/1994 | Frish et al. |
| 5,555,364 | A | 9/1996 | Goldstein |
| 5,599,179 | A | 2/1997 | Lindner et al. |
| 5,807,750 | A | 9/1998 | Baum et al. |
| 5,890,444 | A * | 4/1999 | Martin .............. F23N 5/082 110/346 |
| 5,919,036 | A | 7/1999 | OBrien et al. |
| 5,988,079 | A | 11/1999 | Carter |
| 6,192,660 | B1 * | 2/2001 | Moriyama .............. B65B 7/28 156/69 |
| 6,231,334 | B1 | 5/2001 | Bussman et al. |
| 6,234,030 | B1 | 5/2001 | Butler |
| 6,341,519 | B1 | 1/2002 | Khesin et al. |
| 6,360,680 | B1 | 3/2002 | Breen et al. |
| 6,389,330 | B1 | 5/2002 | Khesin |
| 6,435,860 | B1 | 8/2002 | Brookshire et al. |
| 7,128,818 | B2 | 10/2006 | Khesin et al. |
| 7,148,812 | B2 | 12/2006 | Baggs |
| 7,217,121 | B2 | 5/2007 | Thomson et al. |
| 7,599,803 | B2 | 10/2009 | Scott |
| 8,013,995 | B2 | 9/2011 | Massoli et al. |
| 8,131,470 | B2 * | 3/2012 | Yusti .............. E21B 43/00 702/12 |
| 8,330,616 | B2 * | 12/2012 | Means .............. E21B 49/008 340/853.1 |
| 9,258,495 | B2 | 2/2016 | Zeng et al. |
| 10,041,672 | B2 | 8/2018 | Zhdaneev |
| 2005/0266363 | A1 | 12/2005 | Ganeshan |
| 2006/0044156 | A1 | 3/2006 | Adnan et al. |
| 2006/0115154 | A1 * | 6/2006 | Chen .............. G08B 17/125 382/181 |
| 2007/0217436 | A1 * | 9/2007 | Markley .............. H04L 12/2803 370/401 |
| 2007/0281260 | A1 | 12/2007 | McLellan |
| 2008/0221798 | A1 | 9/2008 | Pariag et al. |
| 2008/0233523 | A1 | 9/2008 | Diepenbroek et al. |
| 2008/0240105 | A1 * | 10/2008 | Abdallah .............. H04L 12/66 370/392 |
| 2008/0316048 | A1 * | 12/2008 | Abdallah .............. G01V 11/002 340/854.6 |
| 2009/0029300 | A1 | 1/2009 | Ponzi et al. |
| 2009/0107218 | A1 | 4/2009 | Latham |
| 2009/0151426 | A1 | 6/2009 | Shah et al. |
| 2009/0233248 | A1 | 9/2009 | Dhulst et al. |
| 2009/0246112 | A1 * | 10/2009 | Mills .............. C01B 3/02 423/324 |
| 2009/0321645 | A1 | 12/2009 | Hinnrichs |
| 2010/0127163 | A1 | 5/2010 | Zhdaneev et al. |
| 2010/0262401 | A1 | 10/2010 | Pfeifer et al. |
| 2010/0313674 | A1 | 12/2010 | Dutel |
| 2011/0040501 | A1 | 2/2011 | Martin et al. |
| 2011/0085030 | A1 | 4/2011 | Poe et al. |
| 2011/0098931 | A1 * | 4/2011 | Kosmala .............. E21B 47/00 702/12 |
| 2011/0107944 | A1 | 5/2011 | Terushita et al. |
| 2011/0195364 | A1 * | 8/2011 | Tullos .............. F23G 7/085 431/2 |
| 2011/0301910 | A1 | 12/2011 | Spellicy |
| 2012/0053838 | A1 | 3/2012 | Andrews et al. |
| 2012/0125003 | A1 * | 5/2012 | Behmann .............. F23D 1/02 60/645 |
| 2012/0150451 | A1 * | 6/2012 | Skinner .............. G01N 21/3577 702/24 |
| 2013/0025854 | A1 | 1/2013 | Theron et al. |
| 2013/0125554 | A1 | 5/2013 | Mittricker et al. |
| 2013/0125799 | A1 | 5/2013 | Fried et al. |
| 2013/0247684 | A1 | 9/2013 | Suda et al. |
| 2013/0255486 | A1 | 10/2013 | Hall et al. |
| 2014/0096836 | A1 | 4/2014 | Romero Maimone et al. |
| 2014/0190691 | A1 * | 7/2014 | Vinegar .............. E21B 43/2401 166/272.1 |
| 2014/0334244 | A1 * | 11/2014 | Birouk .............. B01F 15/02 366/131 |
| 2015/0012218 | A1 * | 1/2015 | Selman .............. E21B 47/022 702/9 |
| 2015/0159881 | A1 * | 6/2015 | Cadima .............. F24C 3/126 126/39 E |
| 2015/0167972 | A1 | 6/2015 | Zhdaneev |
| 2015/0226051 | A1 | 8/2015 | Machado et al. |
| 2015/0260397 | A1 | 9/2015 | Talasila et al. |
| 2015/0293506 | A1 * | 10/2015 | Mohideen .............. G05B 13/048 700/282 |
| 2016/0230988 | A1 | 8/2016 | Ulyanov et al. |
| 2017/0138171 | A1 * | 5/2017 | Richards .............. E21B 47/0002 |
| 2018/0274347 | A1 * | 9/2018 | Ricotta .............. C10G 33/06 |
| 2019/0266869 | A1 * | 8/2019 | Mills .............. H04N 7/183 |
| 2019/0373405 | A1 * | 12/2019 | Jones .............. H04W 4/021 |

FOREIGN PATENT DOCUMENTS

| | | |
|---|---|---|
| WO | WO2017019921 A1 | 2/2017 |
| WO | 2018004715 A1 | 1/2018 |
| WO | WO2018004713 A1 | 1/2018 |

OTHER PUBLICATIONS

Examination Report issued in the related AU Application 2014367041, dated Mar. 19, 2018 (3 pages).
Extended Search Report issued in the EP Patent Application No. 16907664.3 dated Jan. 20, 2020, 7 pages.
International Search Report and Written Opinion issued in the related PCT Application PCT/US2016/054041, dated Jan. 16, 2017 (13 pages).
International Search Report and Written Opinion issued in the related PCT Application PCT/US2016/55089, dated Dec. 27, 2016 (9 pages).
Ian Sealy, Positve Measure, Interchange, Jan. 2007, p. 28-29.
Kurt Kinal, Well testing adjustment to marine park, MEA news, Spring 2006, p. 25.
International Search Report and Written Opinion issued in the related PCT Application PCT/2014/066852, dated Mar. 2, 2015 (12 pages).
International Preliminary Report on Patentability issued in the related PCT Application PCT/2014/066852, dated Jun. 21, 2016 (7 pages).
Office action issued in the related EP Application 14816502.0, dated Dec. 21, 2017.
International Preliminary Report on Patentability issued in the related PCT Application PCT/US2016/054041, dated Apr. 3, 2018 (7 pages).
Meribout et al., 2010, A multisensor Intelligent Device of Real-Time Multiphase Flow Metering in Oil Fields, IEEE Transactions on Instrumentation and Measurement; vol. 59, Issue 6, 1507-1519.

(56) References Cited

OTHER PUBLICATIONS

Wu et al., 2001, Intelligent Identification system of flow regime of Oil-Gas-Water multiphase flow, International Journal of Multiphase Flow; vol. 27, Issue 3, 459-475.

International Search Report and Written Opinion issued in the related PCT Application PCT/US2016/055092, dated Dec. 15, 2016 (10 pages).

International Preliminary Report on Patenability issued in the related PCT Application PCT/US2016/055092, dated Jan. 1, 2019 (7 pages).

Tuntrakonn A. et al., Image-based Flame Control of a Premixed Gas Burner using Fuzzy Logics, the Journal of KMUTNB., 2004, vol. 14, No. 4, Oct.-Dec. 2004 (5 pages).

International Search Report and Written Opinion issued in the PCT Application PCT/US2020/032834, dated Aug. 13, 2020 (6 pages).

* cited by examiner

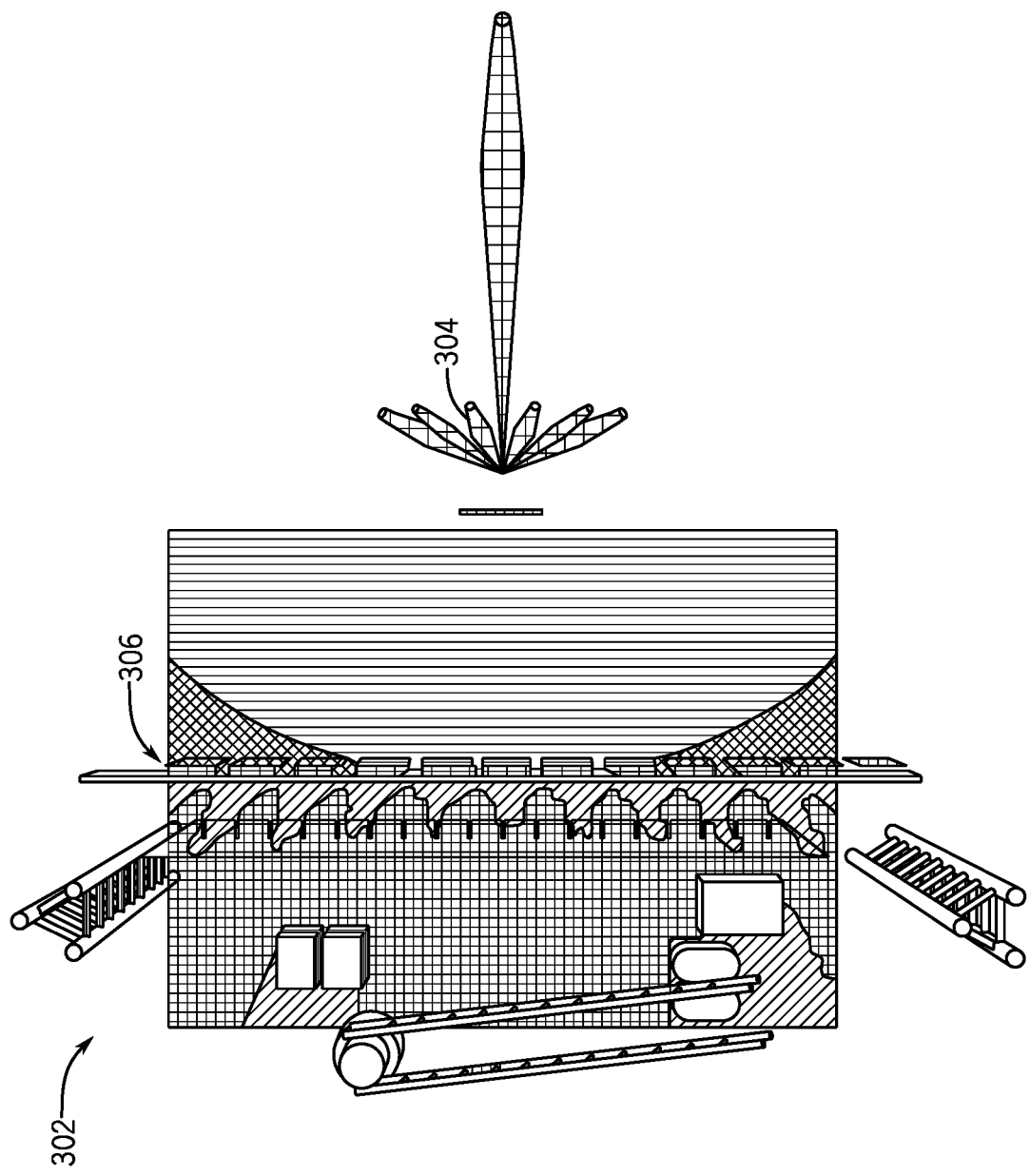

BURNER MONITORING AND CONTROL SYSTEMS

BACKGROUND

Field

The present disclosure relates to burners, such as oil and gas burners that may be used in the oilfield industry. More particularly, the present disclosure relates to tools and methods for a monitoring system for a burner.

Description of the Related Art

Hydrocarbons are widely used as a primary source of energy, and have a great impact on the world economy. Consequently, the discovery and efficient production of hydrocarbon resources is increasingly noteworthy. As relatively accessible hydrocarbon deposits are depleted, hydrocarbon prospecting and production has expanded to new regions that may be more difficult to reach and may pose new technological challenges. During typical operations, a borehole is drilled into the earth, whether on land or below the sea, to reach a reservoir containing hydrocarbons. Such hydrocarbons are typically in the form of oil, gas, or mixtures thereof which may then be brought to the surface through the borehole.

Well testing is often performed to help evaluate the possible production value of a reservoir. During well testing, a test well is drilled to produce a test flow of fluid from the reservoir. During the test flow, parameters such as fluid pressure and fluid flow rate are monitored over a period of time. The response of those parameters may be determined during various types of well tests, such as pressure drawdown, interference, reservoir limit tests, and other tests generally known by those skilled in the art. The data collected during well testing may be used to assess the economic viability of the reservoir. The costs associated with performing the testing operations may be substantial, however, and therefore testing operations should be performed as efficiently and economically as possible.

Fluids produced from the test well are generally considered to be waste and therefore are typically disposed of by burning, which raises environmental and safety concerns. Conventionally, the fluids are separated into gas and liquids inside a separator vessel, then burned using one of three types of burners: 1) an oil burner for liquid phase that will mix crude oil and air for a good combustion, 2) a gas flare that will directly burn the dry gas, and 3) a multiphase burner that can burn both phases simultaneously within certain limits.

Conventional burners may be configured to atomize the waste effluent prior to combustion. The waste effluent, however, is typically provided above a minimum pressure for effective atomization. When the waste effluent drops below the minimum atomization pressure, a condition known as "fall out" may occur during which the hydrocarbon-containing waste effluent is not combusted but instead is discharged into the surrounding environment. Burners are also designed to combust waste effluent at a maximum flow rate. If the flow rate of waste effluent were decreased below a certain limit, the combustion would no longer be acceptable. When the waste effluent flow rate drops below the minimum flow rate, "fall out" may also occur.

Well testing implies very large variations of flow rates, gas flow rates, and other environmental factors that alter flame and combustion efficiency. To account for large potential fluctuations in burning efficiency, the current practice is for the operators to observe the burner using just their natural vision. The operator then adjusts the flow rates or other variables within their control that affect burning efficiency, based on the operators' experience and what they see and analyze in real-time with their own natural abilities.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Some embodiments of the present disclosure relate to monitoring and controlling burning operations, such as the burning of oil or gas at a wellsite via a burner. In one embodiment, a method includes igniting oil or gas with a burner during a burning operation and monitoring the burning operation with a camera. More specifically, monitoring the burning operation can include acquiring image data for a flame of the burner via the camera and analyzing the acquired image data to detect image features indicative of combustion of the oil or gas via the burner.

In another embodiment, the wellsite apparatus can include a separator for receiving a multiphase fluid and a burner coupled downstream from the separator for burning oil or gas of the multiphase fluid. The apparatus can also include a camera positioned to acquire image data indicative of operation of the burner during burning of oil or gas. Still further, the apparatus can include an analysis system for analyzing operation of the burner based on the image data acquired with the camera.

Various refinements of the features noted above may exist in relation to various aspects of the present embodiments. Further features may also be incorporated in these various aspects as well. These refinements and additional features may exist individually or in any combination. For instance, various features discussed below in relation to the illustrated embodiments may be incorporated into any of the above-described aspects of the present disclosure alone or in any combination. Again, the brief summary presented above is intended just to familiarize the reader with certain aspects and contexts of some embodiments without limitation to the claimed subject matter.

BRIEF DESCRIPTION OF THE DRAWINGS

So that the manner in which the above recited features can be understood in detail, a more particular description may be had by reference to embodiments, some of which are illustrated in the appended drawings, wherein like reference numerals denote like elements. It is to be noted, however, that the appended drawings illustrate various embodiments and are therefore not to be considered limiting of its scope, and may admit to other equally effective embodiments.

FIG. 19 shows a top view of the schematic diagram shown in FIG. 18.

DETAILED DESCRIPTION

In the following description, numerous details are set forth to provide an understanding of some embodiments of the present disclosure. However, it will be understood by those of ordinary skill in the art that the system or methodology may be practiced without these details and that numerous variations or modifications from the described embodiments may be possible.

In the specification and appended claims: the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down", "upper" and "lower", "upwardly" and downwardly", "upstream" and "downstream"; "above" and "below"; and other like terms indicating relative positions above or below a given point or element are used in this description to more clearly describe some embodiments of the disclosure.

Certain embodiments of the present disclosure relate to burners used in field operations, more particularly, to methods and systems to monitor and control burners at a wellsite. The methods include capturing an image of a flame from a burner and processing the image using various methods for detecting features from the images that will give information about the combustion of fluid with an oil or gas burner. The information about the combustion, or other results from analyzing image data pertaining to the flame of a burner, can be communicated to operators or used to initiate control of a burning operation. These techniques may be used to facilitate well testing or other field operations at a wellsite.

Figure 1:
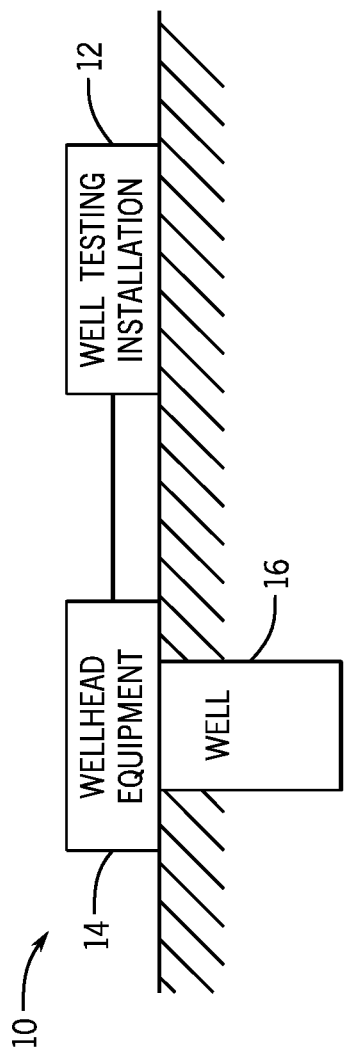
FIG. 1 generally depicts a well testing installation at a wellsite in accordance with an embodiment of the present disclosure.

Turning now to the drawings, a wellsite 10 is generally depicted in FIG. 1 in accordance with one embodiment. As presently shown, a well testing apparatus or installation 12 is deployed at the wellsite 10 (and may, thus, be referred to as a wellsite apparatus) and is coupled to wellhead equipment 14 installed at a well 16. The wellhead equipment 14 can include any suitable components, such as casing and tubing heads, a production tree, and a blowout preventer, to name but a few examples. Fluid produced from the well 16 can be routed through the wellhead equipment 14 and into the well testing apparatus 12. It will be appreciated that the wellsite 10 can be onshore or offshore. In offshore contexts, the well testing apparatus 12 can be installed on an offshore drilling rig at the wellsite 10.

In many cases, operation of a well testing apparatus can be split into four elementary functions: well control, separation, fluid management, and burning. In an example of a well testing apparatus 12 depicted in FIG. 2, these functions can be carried out by functional groups including a well control assembly 20, a separation portion 22, a fluid management assembly 24, and a burning operation portion 26. While certain elements of the well control apparatus 12 are shown in the present figure and discussed below, it is noted that the apparatus 12 may include other components in addition to, or in place of, those presently illustrated and discussed. For example, the well control apparatus 12 can include a gas specific gravity meter, a water-cut meter, a gas-to-oil ratio sensor, a carbon dioxide sensor, a hydrogen sulfide sensor, or a shrinkage measurement device. These and other components could be used at any suitable location within the well control apparatus 12, such as upstream or downstream of a separator (e.g., as part of the well control assembly 20 or the fluid management assembly 24).

Figure 2:
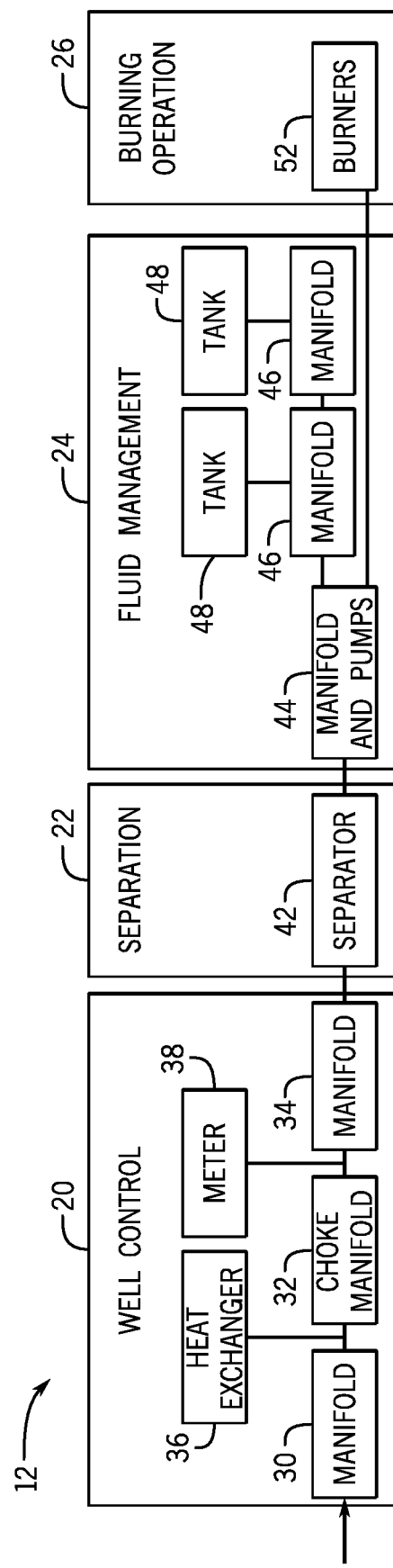
FIG. 2 is a block diagram representing functional groups of a well testing apparatus in accordance with an embodiment of the present disclosure.

Effluents from the well 16 can be received in the well control assembly 20 and then routed to the separation portion 22 downstream of the assembly 20. The well control assembly 20 is shown in FIG. 2 as having flow control equipment in the form of various manifolds (i.e., an intake manifold 30, a choke manifold 32, and an additional manifold 34) for receiving and routing the well effluents. The depicted well control assembly 20 also includes a heat exchanger 36, which may be provided as a steam-heat exchanger, and a flow meter 38 for measuring flow of fluid through the well control assembly 20.

The well control assembly 20 conveys the effluents received from the well 16 to a separator 42. The features of the separator 42 can vary between embodiments. For example, the separator 42 can be a horizontal separator or a vertical separator, and can be a two-phase separator (e.g., for separating gas and liquids) or a three-phase separator (e.g., for separating gas, oil, and water) in different embodiments. Further, the separator 12 can include any of various mechanisms that facilitate separation of components of the incoming fluid, such as diffusers, mist extractors, vanes, baffles, and precipitators to name several examples.

In many instances, the well effluents are provided in the form of a multiphase fluid having a combination of oil, gas, and water. In at least some embodiments the separator 42 can be used to generally separate the multiphase fluid into its oil, gas, and water phases, and these separate fluids may be routed away from the separator 42 to the fluid management assembly 24. As will be appreciated by those skilled in the art, these separated fluids may not be entirely homogenous. That is, separated gas exiting the separator 42 can include some residual amount of water or oil and separated water exiting the separator 42 can include some amount of oil or entrained gas. Likewise, separated oil leaving the separator 42 can include some amount of water or entrained gas.

Referring again to FIG. 2, the separated fluids can be routed downstream from the separator 42 to the fluid management assembly 24. The fluid management assembly 24 includes flow control equipment, such as various manifolds and pumps (generally represented by block 44) for receiving fluids from the separator and conveying the fluids to other destinations, as well as additional manifolds 46 for routing fluid to and from fluid tanks 48. Although two manifolds 46 and two tanks 48 are depicted in FIG. 2, it is noted that the number of manifolds 46 and tanks 48 can be varied. For instance, in one embodiment the fluid management assembly 24 includes a single manifold 46 and a single tank 48, while in other embodiments the fluid management assembly 24 includes more than two manifolds 46 and more than two tanks 48.

The manifolds and pumps represented by block 44 can include a variety of manifolds and pumps, such as a gas manifold, an oil manifold, an oil transfer pump, a water manifold, and a water transfer pump. In at least some embodiments, the manifolds and pumps of block 44 can be used to route fluids received from the separator 42 to the fluid tanks 48 via the additional manifolds 46, and to route fluids between tanks 48. The manifolds and pumps of block 44 can also be used to route fluids received from the separator 42 directly to burners 52 for burning gas and oil (bypassing the tanks 48) or to route fluids from the tanks 48 to the burners 52.

As noted above, the components used in the apparatus 12 may vary between different applications. Still further, the equipment within each functional group of the well testing apparatus 12 may also vary. For example, the heat exchanger 36 could be provided as part of the separation portion 22, rather than of the well control assembly 20.

In certain embodiments, the well testing apparatus 12 is a surface well testing apparatus that can be monitored and controlled remotely. Remote monitoring of the well testing apparatus can be effectuated with sensors installed on various components of the functional groups of the apparatus, as discussed in greater detail below. In some instances, a monitoring system (e.g., sensors, communication systems, and human-machine interfaces) of the well testing apparatus 12 enables monitoring of each of its well control, separation, fluid management, and burning functions, though fewer functions could be monitored in other instances. For example, as also discussed in greater detail below, one or more cameras can be used to monitor the burning function and facilitate control of a burning operation through analysis of image data acquired by the cameras.

Figure 3:
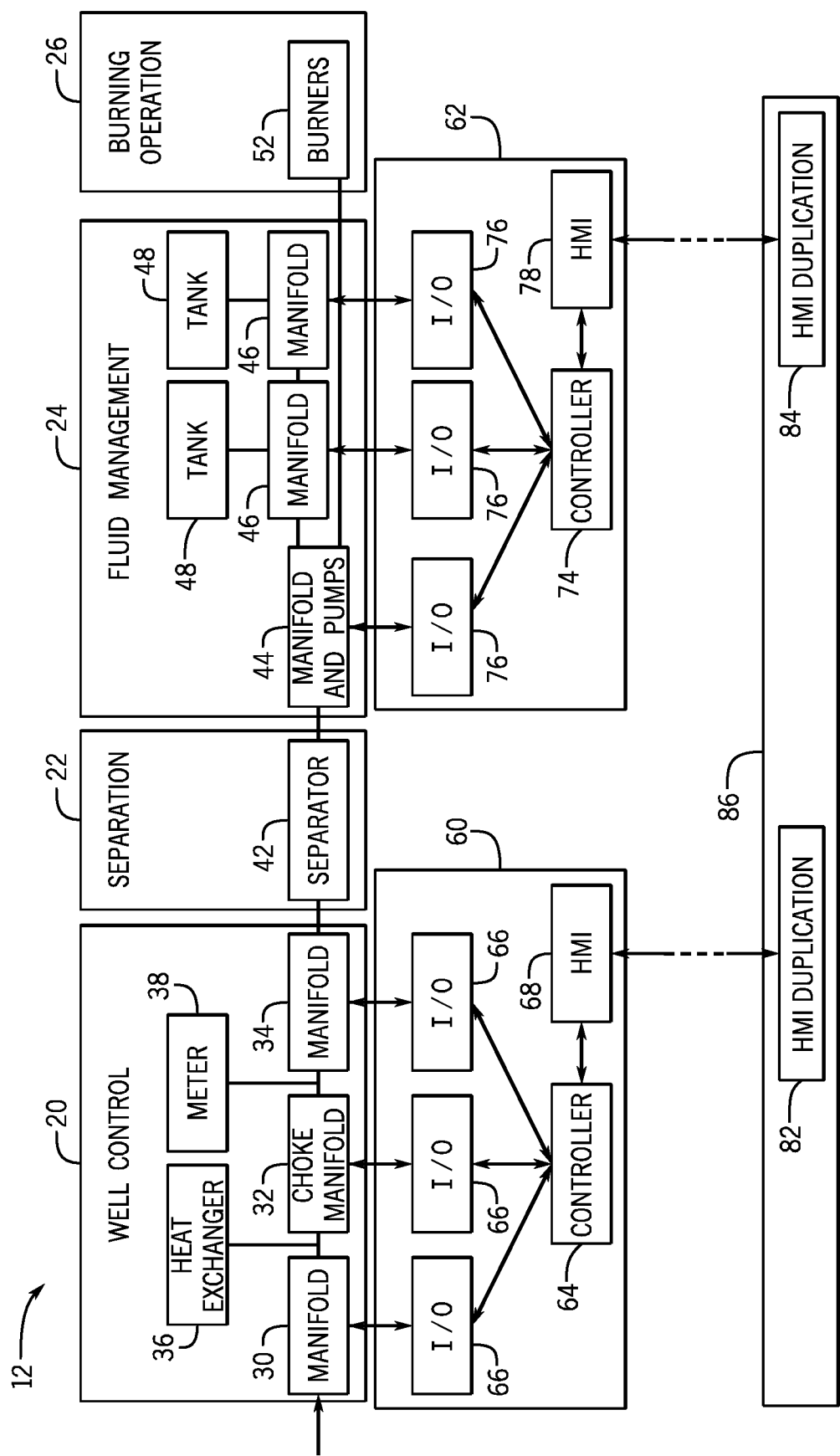
FIG. 3 depicts the functional groups of the well testing apparatus of FIG. 2 with control equipment for controlling certain well control and fluid management aspects of the well testing apparatus in accordance with an embodiment of the present disclosure.

The well testing apparatus 12 may also include various control systems to enable remote control of components of the apparatus. For instance, the well testing apparatus 12 is shown in FIG. 3 as including control equipment 60 that enables remote control of components of the well control assembly 20, as well as control equipment 62 that enables remote control of components of the fluid management assembly 24. Though control equipment 60 and 62 for the assemblies 20 and 24 are described here as examples, it will be appreciated that control equipment could be similarly provided for the separation or burning operation portions 22 and 26. The control equipment 60 includes a controller 64 connected to various components of the well control assembly 20 via input/output modules 66. More specifically, the input/output modules 66 allow communication between the controller 64 and various sensors and actuators of the manifolds 30, 32, and 34. A human-machine interface (HMI) 68 allows communication between the controller 64 and an operator. Similarly, the control equipment 62 includes a controller 74 connected to various sensors and actuators of manifolds and pumps of the fluid management assembly 24 via input/output modules 76, as well as an HMI 78 that enables communication between the controller 74 and the same or a different operator.

The controllers 64 and 74 can be provided in any suitable form, such as programmable logic controllers. The HMIs 68 and 78 can also take any suitable forms, such as a device with display screens and physical keys or buttons, or devices with touchscreens that enable user input on the screens themselves. The HMIs 68 and 78 can display information to the operator, such as measurements or operational status of well control apparatus 12, while allowing the operator to provide commands (via user input) to the controllers 64 and 74.

In at least some embodiments, the well testing apparatus 12 enables local control of components of one or more of the functional groups of the apparatus 12. For example, the control equipment 60 can be provided locally as part of the well control assembly 20, and the control equipment 62 can be provided locally as part of the fluid management assembly 24, rather than providing the control equipment 60 and 62 at a location remote from the assemblies 20 and 24 (e.g., in a cabin at the wellsite). Indeed, the control equipment 60 and 62 can be mounted on skids shared with flow control equipment of the assemblies 20 and 24, respectively. The controllers 64 and 74 can operate as a local intelligence for controlling connected equipment of the assemblies 20 and 24. The local intelligence can be designed specifically for a given function of the well control apparatus (e.g., fluid management). With respect to the well control assembly 20, the local intelligence embodied in controller 64 can be used to actuate valves of the manifolds 30, 32, and 34, for instance. By way of further example, the local intelligence of controller 74 can be used to actuate pumps or valves of manifolds of the fluid management assembly 24.

In addition to the HMIs 68 and 78 that can be provided at or near equipment of the well testing apparatus 12, duplicate HMIs 82 and 84 can be provided away from the assemblies 20 and 24 at a control cabin 86 at the wellsite or some other location removed from the assemblies 20 and 24. The duplicate HMIs 82 and 84 provide redundancy, facilitating both local control at the equipment of the well testing apparatus 12 (via the HMIs 68 and 78) and global control from a location further away from the controlled equipment (via HMIs 82 and 84). This architecture allows the main control point for a given function (e.g., HMI 68 or 78) to be positioned next to the controlled equipment, while having a back-up control point in the control cabin or other location away from the controlled equipment. Further, controlling the flow control equipment or other equipment of the well testing apparatus 12 via HMI 68 or 78 positioned with the controlled equipment, rather than with HMI 82 or 84 removed from the controlled equipment, may allow an operator to directly sense certain contextual clues about operation of the well control assembly independent of the HMI 68 or 78 used by the operator. For example, while using the HMI 78, the operator may hear noises or feel vibrations from components of the well testing assembly 12. Such additional, sensory clues may provide insight into the operation of the well testing assembly 12 and inform decision-making by the operator regarding control of the assembly.

Although control equipment 60 and 62 enables local control of two functions of the well testing apparatus 12 (i.e., well control and fluid management), other embodiments may be configured to provide local control of a different number of functions. For instance, control equipment 60 or control equipment 62 could be omitted to provide local control of a single function of the apparatus 12, or additional control equipment could be provided for local control of other functions (e.g., burning operation). Further, while the control equipment 60 and 62 may be used to control flow control equipment (e.g., manifolds and pumps) of the assemblies 20 and 24, the control equipment 60 and 62 could also or instead be used to control other components of the well testing apparatus 12.

In some embodiments the local intelligence is designed to control just a given elementary function, which offers flexibility to remotely control one or several elementary functions by varying the number of local intelligences coupled to components of the well testing apparatus 12. Furthermore, the equipment within a functional group may vary (e.g., the number of tanks for fluid management). To accommodate such variability, the hardware and software of the control system in at least some embodiments are modular. With respect to varying numbers of fluid tanks in the fluid management assembly 24, for instance, each fluid tank can be provided as part of an individual physical module (e.g., including a single manifold 46 and a single tank 48) and a corresponding software module can be implemented in configurable control software of the controller 74.

Figure 4:
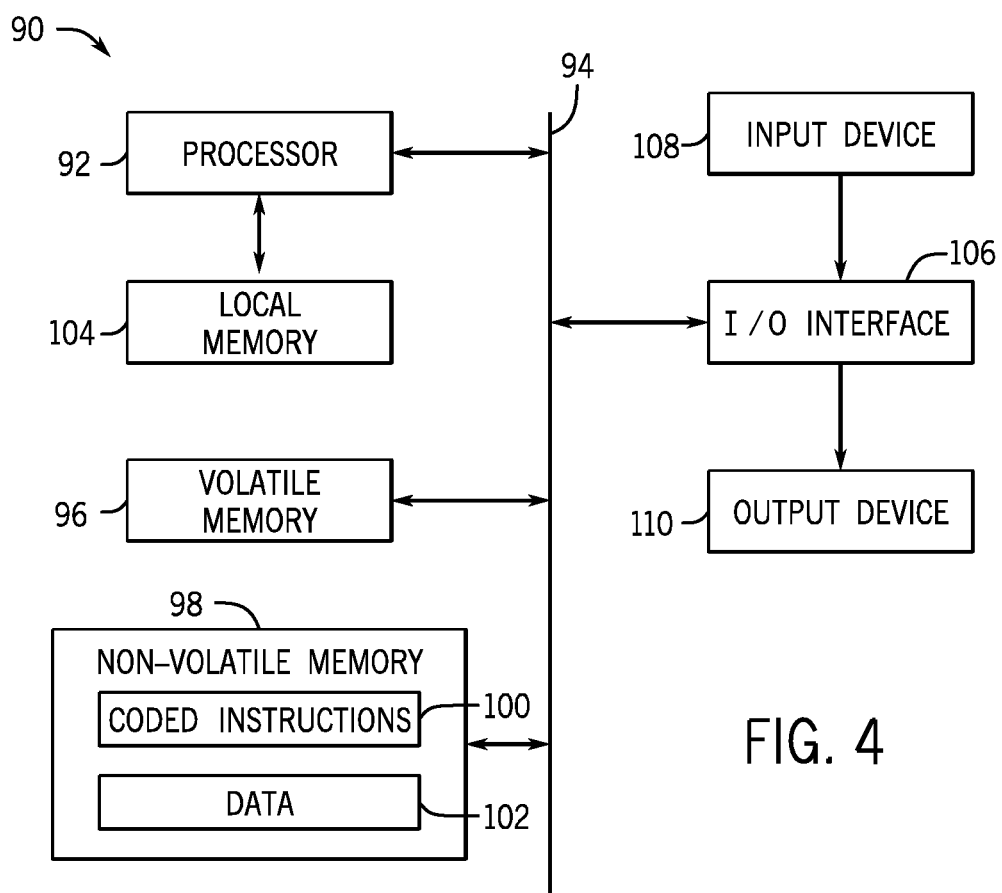
FIG. 4 is a block diagram of components of a processor-based system that can be used to perform certain monitoring or control operations in accordance with an embodiment of the present disclosure.

The controllers 64 and 74, as well as various other data monitoring or control components discussed below, may be provided as processor-based systems. Such processor-based systems may include programmable logic controllers or programmed general-purpose computers, to name just two examples. An example of a processor-based system 90 is generally provided in FIG. 4. In this depicted embodiment, the system 90 includes at least one processor 92 connected by a bus 94 to volatile memory 96 (e.g., random-access memory) and non-volatile memory 98 (e.g., flash memory). Coded application instructions 100 (such as the programmed local intelligence of the controllers 64 and 74) and data 102 are stored in the non-volatile memory 98. The instructions 100 and the data 102 may also be loaded into the volatile memory 96 (or in a local memory 104 of the processor) as desired, such as to reduce latency and increase operating efficiency of the system 90. The coded application instructions 100 can be provided as software that may be executed by the processor 92 to enable various functionalities described herein. In at least some embodiments, the application instructions 100 are encoded in a non-transitory, computer-readable storage medium, such as the volatile memory 96, the non-volatile memory 98, the local memory 104, or a portable storage device (e.g., a flash drive or a compact disc). An interface 106 of the system 90 enables communication between the processor 92 and various input devices 108 and output devices 110. The interface 106 can include any suitable device that enables such communication, such as a modem or a serial port. In some embodiments, the input and output devices 108 and 110 include controlled components of the well testing apparatus 12 and an HMI that enables communication between the system 90 and a user.

In various embodiments, controllers of the well testing apparatus 12, such as controllers 64 and 74, are configured (e.g., with programmed software) to control equipment of the apparatus 12 according to different modes. In one mode, which can be referred to as "manual remote control," an operator interacts with an HMI to control a given valve or other component of the well testing apparatus 12. For example, the operator may instruct a particular valve to open or close. In such an operating mode, the operator is fully responsible for the instructed action and there is no safety intelligence to support the decision or warn the operator of an improper command.

A different mode of operation, which can be referred to as "semi-automated remote control," is similar to the manual remote control mode noted above, but with local intelligence of a controller validating the operator's action against safety, quality, or other constraints. (These constraints can be stored as data in a memory of the controller.) For instance, one constraint may be that the operator may not open together a valve that would allow fluid to pass to a flare or other burner on a starboard side of a rig and a valve that would allow fluid to pass to a flare or other burner on the port side of the rig. That is, it can be undesirable to flare gas or burn oil on both the port and starboard sides of the rig simultaneously, and a constraint may be programmed into the control system so as to avoid such an occurrence.

Figure 5:
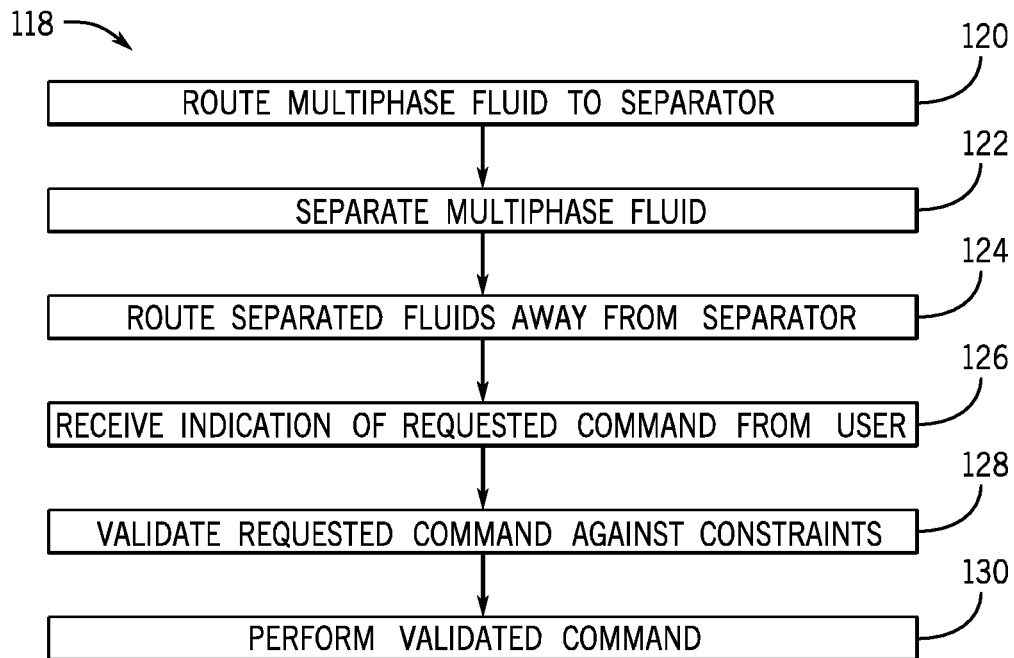
FIGS. 5 and 6 are flowcharts representing processes for controlling operation of a well testing apparatus in accordance with certain embodiments of the present disclosure.

A further example of a semi-automated remote control process is generally represented by flowchart 118 in FIG. 5. In this embodiment, a multiphase fluid is routed to a separator (block 120), which separates the multiphase fluid (block 122) into separate fluids as described above. The separated fluids are routed away from the separator (block 124), such as to fluid tanks for storage or to burners or other destinations for disposal. The flow of the separated fluids downstream from the separator can be controlled by actuating pumps and valves of the fluid management assembly 24. Such flow can include routing of the separated fluids to a tank or to a disposal destination, routing separated fluids from a tank to a disposal destination, or routing separated fluids from one tank to another tank. The operator can indicate a requested command for controlling a valve or other component—such as opening or closing a valve or starting a pump—via an HMI in communication with the controller.

In a manual remote control mode, the controller may transmit an actuation signal to the controlled component in response to receipt of the user input of a requested command at the HMI. For example, a user can command a particular valve to open via the HMI, and the controller would then transmit an actuation signal to the valve actuator in response to the user input without considering the current operational status of other components of the well testing apparatus or the effect of actuating the valve as commanded. In contrast, in a semi-automated remote control mode, the received user indication of a requested command (block 126) is validated against constraints (block 128), such as with the local intelligence of the controller, so as to avoid undesired operation of the well testing apparatus. If the requested command would violate a given constraint—such as a safety constraint that one valve not be open at the same time as a particular different valve—the command would not be performed. In such a case, an error message could be provided to the operator via the HMI. The local intelligence in this example could assess the operating status of the two valves to determine whether a first of the two valves is closed before sending an actuation signal from the controller to the actuator of the second of the two valves to open the second valve. Once validated against the constraints, the requested command is performed (block 130) by sending the actuation signal to the controlled valve or other component.

Another mode of operation of the controller can be referred to as "automated remote control." In this control mode, the action of the operator from a remote control HMI launches a procedure resulting in multiple actions to be automatically performed by the controller. For example, an operator may select, via the HMI, an option to "transfer water from tank A to tank B" (e.g., the two fluid tanks 48 in FIG. 3). In response to this single selection, the controller may automatically send actuation signals to initiate a sequence of opening an inlet valve of tank B, opening an outlet valve of tank A, and starting a water pump, among other operations. Procedures can be programmed to line up a given flow path from a source (such as the separator 42 or a tank 48) to a destination (such as to another tank 48 or a burner 52) for a given fluid (such as oil).

Figure 6:
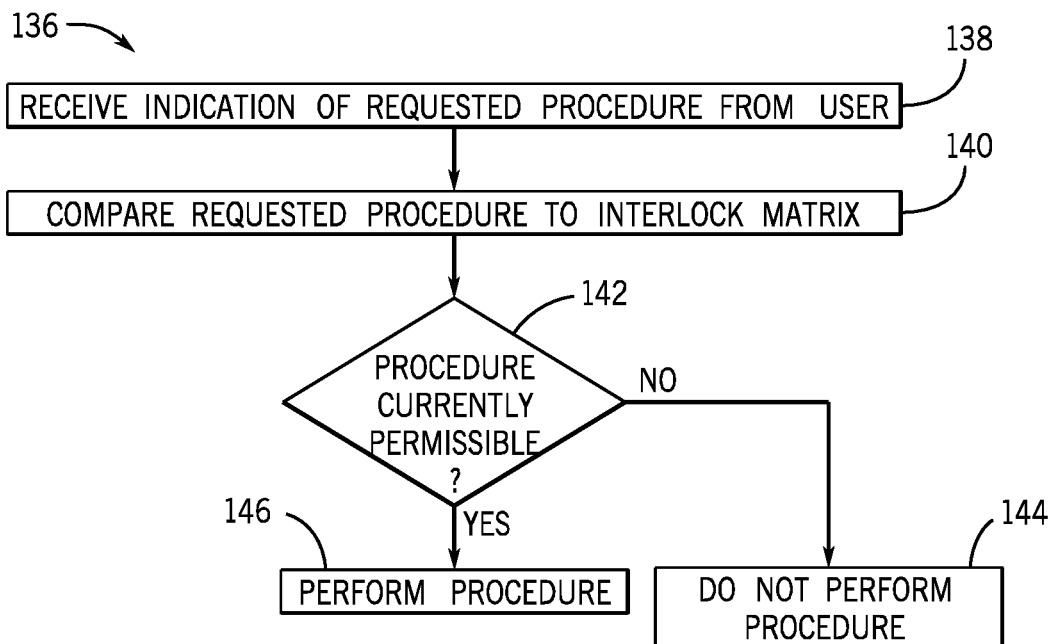

An example of an automated remote control process is generally represented by flowchart 136 in FIG. 6. In this embodiment, an indication of a user-requested operational procedure is received (block 138), such as through user input at a remote control HMI. In the automated remote control mode, the requested procedure can be automatically compared to an interlock matrix (block 140) to prevent the launch of incompatible sequences together (such as "flow oil to burner port side" and "flow gas to flare starboard side"). This is generally represented by decision block 142, in which local intelligence can determine whether the requested operational procedure is permissible (e.g., whether it is compatible or incompatible with another procedure being performed or with the current operational state of the well testing apparatus). If the requested procedure is not permissible, the controller does not perform the procedure (block 144) and an error message can be given to the operator. If the requested procedure is determined to be permissible, it is then automatically performed (block 146), such as by sending actuation signals to the components to be controlled. It is further noted that the controller can include an event logger that records events, operator actions, error messages, and alarms for the control system.

Surface well testing installations may use a large deck space to spot and fix equipment and interconnect them with piping. As discussed above, the well testing apparatus 12 may take many forms. As one example, the well testing apparatus 12 may be provided in the form of a surface well testing system or apparatus 150 generally illustrated in FIG. 7. In this depicted embodiment, a multiphase fluid (represented here by arrow 152) enters a flowhead 154 and is routed to a separator 170 through a surface safety valve 156, a steam-heat exchanger 160, a choke manifold 162, a flow meter 164, and an additional manifold 166. The apparatus 150 in FIG. 7 also includes a chemical injection pump 158 for injecting chemicals into the multiphase fluid flowing toward the separator 170.

In the presently depicted embodiment, the separator 170 is a three-phase separator that generally separates the multiphase fluid into gas, oil, and water components. The separated gas is routed downstream from the separator 170 through a gas manifold 174 to either of the burners 176 for flaring gas and burning oil. The gas manifold 174 includes valves that can be actuated to control flow of gas from the gas manifold 174 to one or the other of the burners 176. Although shown next to one another in FIG. 7 for clarity, the burners 176 may be positioned apart from one another, such as on opposite sides of a rig.

Figure 7:
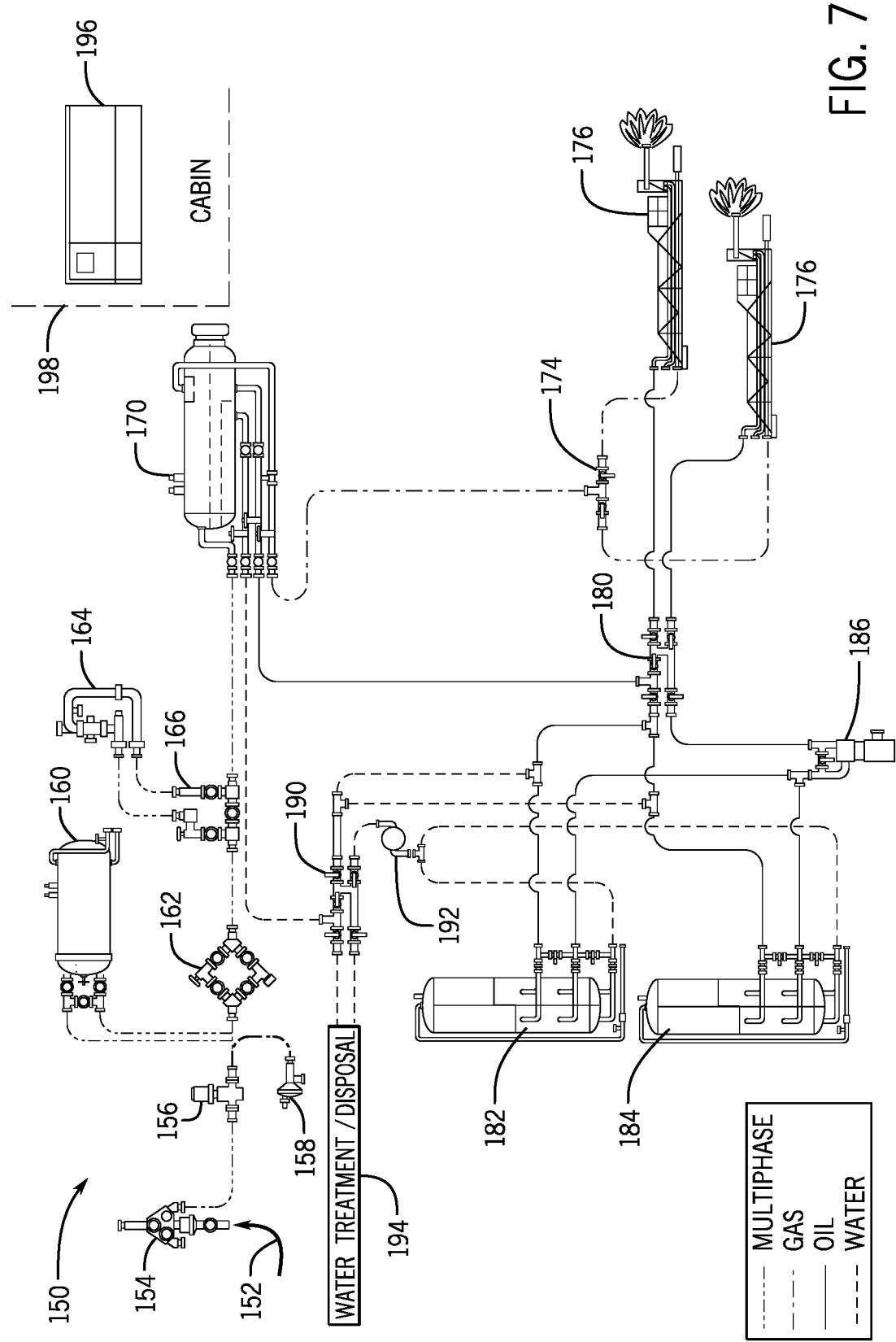
FIG. 7 depicts various equipment of a well testing apparatus in accordance with an embodiment of the present disclosure.

The separated oil from the separator 170 is routed downstream to an oil manifold 180. Valves of the oil manifold 180 can be operated to permit flow of the oil to either of the burners 176 or either of the tanks 182 and 184. The tanks 182 and 184 can take any suitable form, but are depicted in FIG. 7 as vertical surge tanks each having two fluid compartments. This allows each tank to simultaneously hold different fluids, such as water in one compartment and oil in the other compartment. An oil transfer pump 186 may be operated to pump oil through the well testing apparatus 150 downstream of the separator 170. The separated water from the separator 170 is similarly routed to a water manifold 190. Like the oil manifold 180, the water manifold 190 includes valves that can be opened or closed to permit water to flow to either of the tanks 182 and 184 or to a water treatment and disposal apparatus 194. A water transfer pump 192 is used to pump the water through the system.

As will be appreciated, the well test area in which the well testing apparatus 150 (or other embodiments of a well testing apparatus) is installed may be classified as a hazardous area. In some embodiments, the well test area is classified as a Zone 1 hazardous area according to International Electrotechnical Commission (IEC) standard 60079-10-1: 2015. The various equipment of the well testing apparatuses described herein, including flow control equipment and controllers, may be positioned within such a Zone 1 hazardous area.

Referring again to FIG. 7, a cabin 196 at the wellsite may acquire data from the well testing apparatus 150. This acquired data can be used to monitor and control the well testing apparatus 150. In at least some instances, the cabin 196 is set apart from the well test area having the well testing apparatus 150 in a non-hazardous area. This is represented by the dashed line 198 in FIG. 7, which generally serves as a demarcation between the hazardous area having the well testing apparatus 150 and the non-hazardous area of the cabin 196.

The equipment of a well testing apparatus is monitored during a well testing process to verify proper operation and facilitate control of the process. Such monitoring can include taking numerous measurements during the well test, examples of which include choke manifold temperature and pressures (upstream and downstream), heat exchanger temperature and pressure, separator temperature and pressures (static and differential), oil flow rate and volume from the separator, water flow rate and volume from the separator, and fluid levels in tanks of the apparatus. In some instances, these data are recorded manually by an operator who walks around the well test area and records the measurements and other process information on a sheet of paper (e.g., a reading sheet) to inform future decision-making regarding control of the well test. With the various equipment of the well testing apparatus spread about the well test area, such manual measurement collection can be time-consuming. Taking care to avoid tripping hazards in the well test area and climbing up vertical tanks to read fluid levels in the tanks further increase the time spent manually collecting the process information.

In accordance with at least some embodiments of the present technique, however, a mobile monitoring system is provided with a surface well testing installation. This enables monitoring of the well test process on a mobile device (e.g., a mobile device suitable for use in Zone 1 hazardous area, like the well test area). Various information can be automatically acquired by sensors and then presented to an operator via the mobile device. The mobile monitoring system may provide various functions, such as a sensor data display, video display, sensor or video information interpretation for quality-assurance and quality-control purposes, and a manual entry screen (e.g., for a digital tally book for recording measurements taken by the operator). Further, the monitoring system can be modular and configurable so it may be implemented on any well testing installation that is equipped according to the present techniques.

Figure 8:
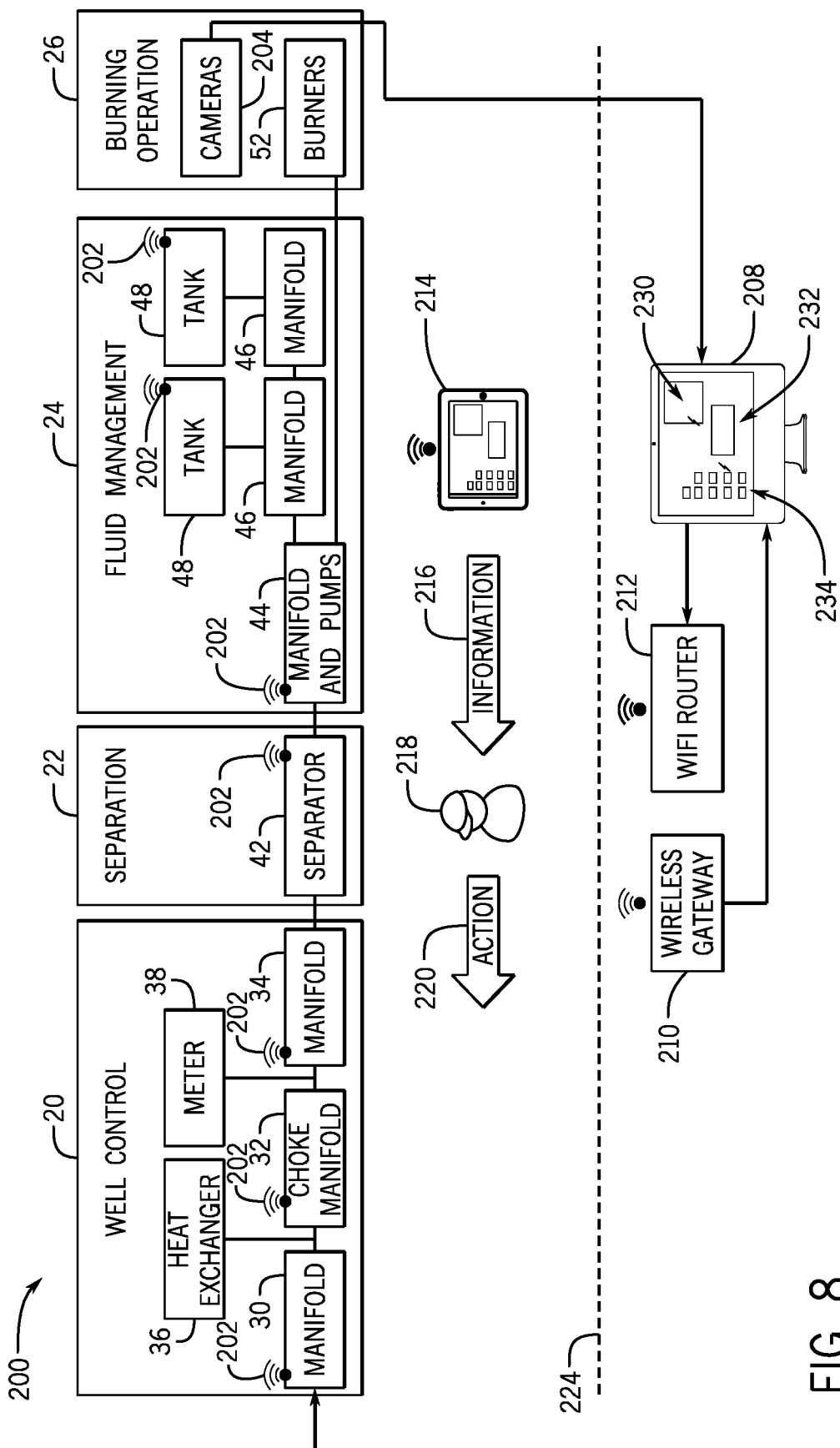
FIG. 8 is a diagram illustrating a mobile monitoring system with a well testing apparatus in accordance with an embodiment of the present disclosure.

An example of a mobile monitoring system 200 is generally depicted with a well testing apparatus in FIG. 8. As noted above, a well testing apparatus 12 may be split into four elementary functions (well control, separation, fluid management, and burning operation), and the equipment used in the apparatus 12 for each function can vary between embodiments. The well testing apparatus depicted in FIG. 8 includes the same functional groups and equipment described above with respect to FIG. 2, but is equipped with data acquisition devices in the form of sensors 202 and cameras 204 for monitoring the well testing functions. In the presently depicted embodiment, the sensors 202 and cameras 204 are deployed to enable monitoring of each of the well testing functions presented above. More specifically, the sensors 202 are installed on various components of the well testing equipment and the cameras 204 may be positioned next to booms of the burners 52 to capture image data (e.g., video) of burner operation. In other embodiments, however, a mobile monitoring system could be used to monitor fewer well testing functions. And while the system depicted in FIG. 8 includes cameras 204 for monitoring the burning operation function and sensors 202 for monitoring components of the well control, separation, and fluid management functions, it will be appreciated that sensors 202 can be used to monitor the burning operation function and that cameras 204 can be used to monitoring the well control, separation, and fluid management functions. Various data may be acquired with the sensors 202 and cameras 204, non-limiting examples of which include pressure measurements, temperature measurements, flow rates, top and interface fluid levels in tanks, and image data (static or video).

The data acquired by the sensors 202 and cameras 204 is communicated to a computer system 208, which may process and store the received data. In the presently depicted embodiment, the sensors 202 are wireless sensors that wirelessly transmit data to the computer system 208 via a wireless gateway 210. Any suitable wireless communication standard may be used; in at least one instance, the sensors 202 are HART® wireless sensors and the wireless gateway is a HART® wireless gateway. Although the sensors 202 are shown as wireless sensors in FIG. 8, it is noted any of these sensors 202 could instead be provided as a wired sensor in communication with the computer system 208. Further, the cameras 204 can transmit data in any suitable manner. Although data from the cameras 204 could be transmitted wirelessly, in at least some embodiments the cameras 204 send video or other data to the computer system 208 over a wired connection.

The computer system 208 communicates information based on the data acquired with the sensors 202 or cameras 204 to a mobile device 214 over a wireless network via a wireless access point, such as a WI-FI® router 212. In some instances, the wireless network can include wireless repeaters to improve communication signal range and strength within the well test area. In one embodiment, the mobile device 214 may receive wirelessly transmitted data directly from one or more sensors 202 or cameras 204.

The mobile device 214 can be carried by an operator 218 within a well test area. The mobile device 214 is a human-machine interface that includes a screen for showing information about a well testing process. More specifically, the mobile device 214 is configured to display information (generally represented by arrow 216) on the screen to the operator 218 about the operation of the well testing apparatus based on the data acquired with the sensors 202 or cameras 204. This enables mobile monitoring of the operation of the well testing apparatus by the operator as the operator moves about the well test area. In at least some embodiments, the mobile device displays such information in real-time, thus enabling real-time mobile monitoring of the well testing process by an operator in the well test area. Any type of information may be displayed, such as sensor data from sensors 202, video captured by the cameras 204, processed data, or interpreted data. Examples of such interpreted data include information regarding choke plugging, choke erosion, carry-over, carry-under, and emulsion detection and characterization in tanks. Additionally, by displaying such process information on the mobile device 214, the operator 218 can assess the urgency of the process status, prioritize tasks, and take appropriate action (generally represented by arrow 220), such as opening or closing valves, in a timely manner. Alarms may also be displayed, and alarms and alarm management actions (such as acknowledgement or reset) can be recorded in an event logger.

In at least some embodiments, the mobile device 214 is certified for usage in Zone 1 hazardous areas and is carried by an operator 218 within a Zone 1 hazardous area (e.g., the well test area), while the computer system 208 is located in a non-hazardous area (e.g., a lab cabin). Dashed line 224 in FIG. 8 generally represents a boundary between these hazardous and non-hazardous areas. Although a single mobile device 214 is shown in FIG. 8 for simplicity, it will be appreciated that the mobile monitoring system could include multiple mobile devices 214 (which could be carried by different operators) that receive well test process information from the computer system 208. Mobile devices 214 could take any suitable form, such as tablet computers or smartphones. Further, the computer system 208 and mobile devices 214 are processor-based systems that include various processing and memory components, such as those described above with respect to system 90 of FIG. 4. Software or other coded instructions resident in the computer system 208 or mobile devices 214 can be used to facilitate the mobile monitoring and control functionalities described herein. Information can be displayed to a user on a screen of the computer system 208 or of a mobile device 214 in any suitable manner, such as via a webpage or a mobile device application.

As discussed above, information based on data acquired with the sensors 202 and the cameras 204 can be displayed to users of the computer system 208 or mobile devices 214. In some embodiments, including that illustrated in FIG. 8, the computer system 208 and the one or more mobile devices 214 are configured to display video 230 in a window on their respective screens, while also displaying additional information (e.g., information 232 and 234) on their screens based on data acquired from one or more sensors 202. In other instances, the video 230 and the additional information 232 and 234 could be displayed at different times, such as consecutively rather than concurrently. While the computer system 208 and the mobile device 214 are depicted in FIG. 8 as displaying identical graphical information on their screens (i.e., video 230 and information 232 and 234), the content of the information displayed on their screens may differ in other instances. For example, less information may be displayed on the screen of the mobile device in some cases due to screen size constraints.

In order to constantly monitor burning operations, the monitoring system 200 can include at least one camera 204 pointed to each burner. In one embodiment, two cameras 204 are pointed to a first burner 52 and two other cameras 204 are pointed to a second burner 52. The cameras 204 (which can detect visible or infrared light) are positioned to acquire image data (video or static) about operation of the burners 52 during burning of oil or gas. The acquired image data can be displayed on a screen of the computer system 208 (such as in a lab cabin) or on a mobile device 214 in the well testing area. The cameras 204 can be individually controlled from the computer system 208 (or from a mobile device 214) to pan, tilt, or zoom the cameras. In at least some embodiments, the video data acquired with the cameras 204 has high-definition resolution (e.g., 720p) and a frame rate of at least 25 frames per second. The cameras 204 can also include microphones, and sound captured by these microphones can be transmitted to the computer system 208 and made available to users (e.g., in the lab cabin). The video and sound captured with the cameras 204 and transmitted to the computer system 208 may be recorded for future use, such as for replay, traceability, contractual engagement, and post-job troubleshooting.

Figure 9:
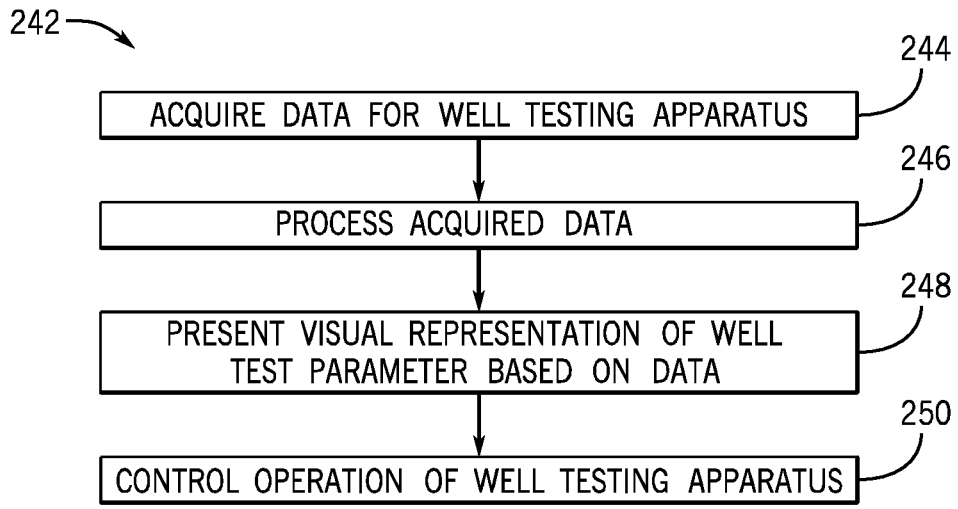
FIG. 9 is a flowchart representing a process for conveying well test information to an operator via a mobile device and controlling a well test apparatus in accordance with an embodiment of the present disclosure.

By way of further example, a process for conveying well test information via a mobile device is generally represented by flowchart 242 in FIG. 9. This embodiment includes acquiring data (block 244) for a well testing apparatus during a well test, such as with a sensor 202 or camera 204. The acquired data is transmitted to a data acquisition system, such as the computer system 208 or the mobile device 214, which processes the acquired data (block 246). Such processing can include any of a variety of actions, such as storing the data, analyzing the data, interpreting the data, or forwarding the data to another device or location. The process represented in FIG. 9 also includes presenting a visual representation (block 248) of a well test parameter on a display of a mobile device (e.g., mobile device 214) present at the wellsite based on the processed data. This can include, for example, displaying real-time values of well test measurements directly acquired by sensors 202 or interpreted from measurements taken by the sensors 202. In some instances, processing the data in block 246 includes identifying trends in the data, and a visual representation of this identified trend may then be presented on a screen of the mobile device 214 or of the computer system 208.

The process represented in FIG. 9 also includes controlling operation of the well testing apparatus (block 250), such as in response to information provided to an operator via the computer system 208 or mobile device 214. In some instances, an operator may manually control operation, such as by walking to a particular valve of the well testing apparatus and then opening or closing the valve. In other instances, however, the well testing apparatus may include remote control functionality, such as that described above, and an operator may initiate control via a human-machine interface. In one such embodiment, the control can be effected by an operator through user input to a mobile device 214 carried by the operator. That is, the mobile device 214 may communicate a command to a controller (e.g., controller 74) to actuate a component or begin an actuation sequence for multiple components.

Additionally, in some embodiments the mobile device 214 can be used as a digital tally book for manual data recording by an operator. For example, the operator can collect well test measurements (such as measurements of fluid properties) independent of the mobile device 214, and then enter those measurements in the mobile device 214. The data entered into the mobile device 214 can be transmitted to another system (e.g., computer system 208) in a real-time or delayed manner.

Figure 10:
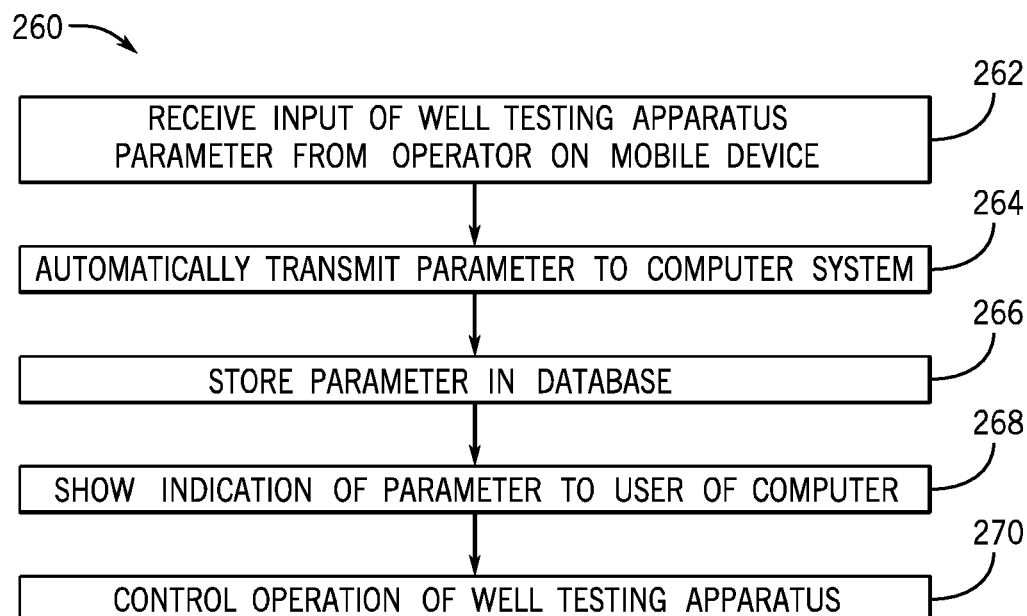
FIG. 10 is a flowchart representing a process for recording and transmitting well test operational data via a mobile device in accordance with an embodiment of the present disclosure.

An example of a process for recording and transmitting well test operational data via a mobile device is generally represented by flowchart 260 in FIG. 10. This embodiment includes receiving from an operator, on a mobile device (such as mobile device 214), input of an operational parameter measured by the operator during a well test (block 262). The process also includes automatically transmitting the measured parameter to a computer system (e.g., computer system 208) during the well test (block 264). In at least one embodiment, the measured parameter is transmitted from the mobile device to the computer system over a wireless network. The measured parameter can be stored (block 266) in a database of well test operational data. The measured parameter can also be processed by the computer system and an indication of the measured parameter can be shown (block 268) to a user of the computer system. The process represented in FIG. 10 also includes controlling operation of the well testing apparatus (block 270). For example, a user of the computer system can input a command to remotely control the well testing apparatus based on the indication of the measured parameter, and a controller of the well testing apparatus can send an actuation signal to one or more components in response to the command.

As noted above, cameras may be used to monitor a burning operation. In certain embodiments, some of which are described in greater detail below, computer vision techniques are used to analyze image data acquired by cameras during burning operations to detect features indicative of combustion of oil or gas with burners observed by the cameras. For example, image data acquired by one or more cameras arranged to observe a flame of a burner can be analyzed to detect the presence of smoke, the flame size, and the flame intensity, each of which can be used to determine burning efficiency and other combustion characteristics. Detected features in the image data can also be used to identify, in real-time, the types of hydrocarbons burned (e.g., lighter oil or heavier oil), process variations (e.g., determining separator efficiency), or heat radiation from the burner. Further, the information derived from analysis of the image data can be used to control a burning operation, such as to optimize combustion or terminate a burning operation.

Figure 11:
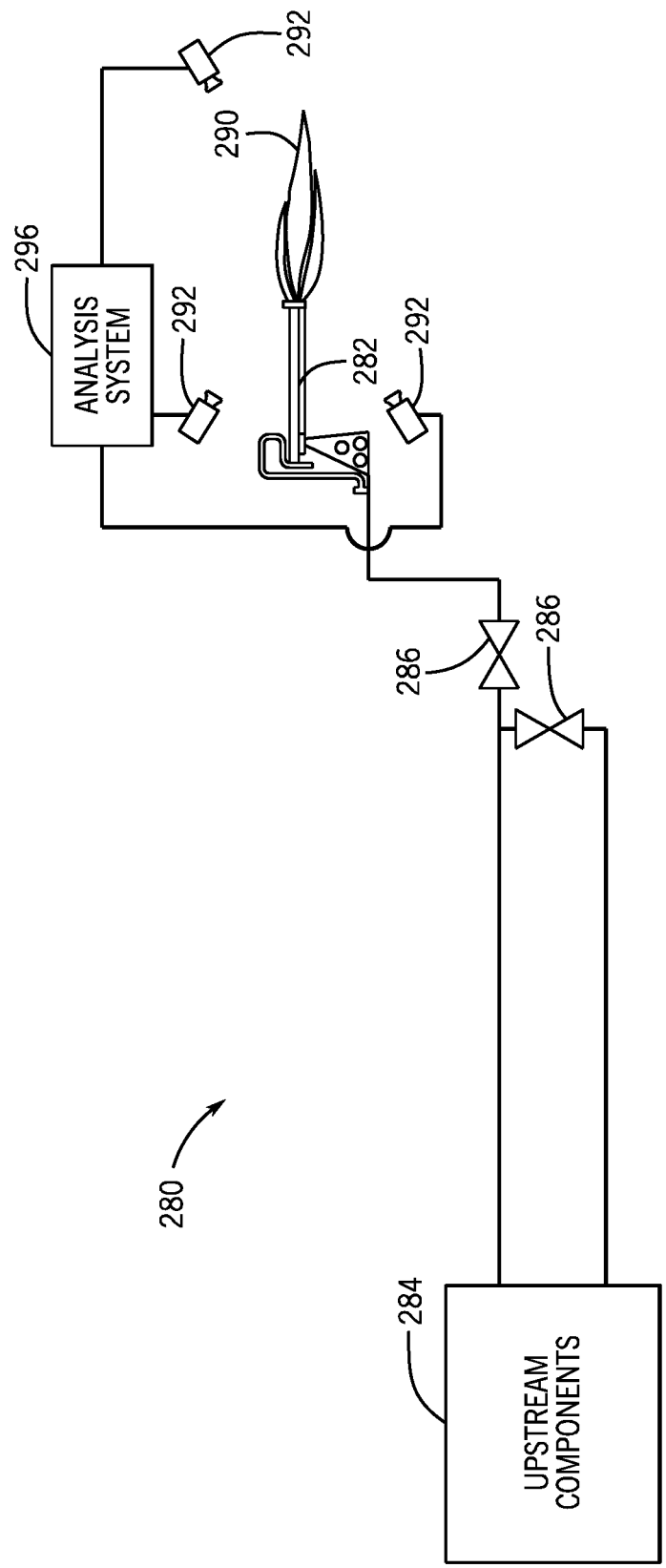
FIG. 11 shows a schematic layout of equipment, including a burner, at a well testing site that may utilize embodiments of the present disclosure.

By way of example, FIG. 11 shows a schematic layout of a system 280 having equipment, including a burner 282, at a well testing site that may utilize embodiments of the present disclosure. Although embodiments of the present disclosure are discussed in the context of an oil or gas burner used during a well testing operation, the systems and methods disclosed herein may be used for any type of operation where monitoring and controlling of a burner may be used, whether in the oil and gas industry or any other industry. During a well testing operation, surface well testing equipment may be used to direct well effluent to a burner, as described above. Each well testing operation may have different design considerations, and thus employ a different set up and types of equipment. As also described above, equipment that may be used in a well testing operation includes separators, pumps, and tanks, which are collectively represented as upstream components 284 in FIG. 11. The effluent (or at least a portion of the effluent) is eventually guided by a pipe or set of pipes to the burner 282, which may be positioned on a boom away from the testing site. The effluent can be routed from a separator directly to the burner 282 in some instances. In others, the effluent can be routed from the separator to one or more tanks, from which the effluent can later be routed to the burner 282. One or more burner manifolds 286 may be used to control the flow of effluent and other fluids to the burner 282 for combustion via a flame 290.

One or more cameras 292 can be installed along the boom or at other locations at a well test site to have a real-time view of the burner 282 during operation. In the presently depicted embodiment, for instance, the system 280 includes three cameras 292 positioned to observe the flame 290 to facilitate monitoring of the burning operation. In at least some embodiments, the one or more cameras 292 and corresponding image processing software will monitor in real-time the burner 282 and the flames 290 coming from the burner to automatically detect various combusted flame features, including smoke texture (black smoke, white smoke, etc.), burner flame colorimetric texture (color of the burner flame), burner flame size, etc. The cameras may be various types of cameras, including optical, infrared, etc. In some instances, the cameras include multispectral cameras that capture image data for wavelengths within different light spectrums, such as within both optical and infrared wavelength ranges. Further, in at least one embodiment, a camera 292 is a multispectral camera calibrated to detect the gas composition of the smoke. The image processing software can be stored in and executed by an analysis system 296 (e.g., a processor-based system 90).

Increasing emphasis is placed on safety and reducing any environmental impact during well testing operations. Burners used during well testing operations get special attention from the operators, as poor oil or gas combustion may cause damage for both people and the environment. When the proper conditions are not fulfilled for an efficient burning of effluent oil or gas with a burner or flaring system, oil droplets can fall onto the sea, land, or other surrounding environment. Also, the heat generated by the burners and radiated to any nearby facilities can be affected by changes in the environment, such as wind speed or direction, potentially resulting in unsafe conditions for operators and equipment.

Systems and methods of monitoring and controlling burners are disclosed herein to improve efficient burning and combustion of oil and gas effluent during well testing. Embodiments disclosed herein, though, are not limited to oil and gas burning during well testing, but any type of oil or gas burner that may benefit from improved monitoring and control.

As indicated above, in certain embodiments a system includes one or more cameras that are positioned in the field operation so that they will have a direct view of the burners and the flames emanating from the burners. Any suitable types of cameras may be used, such as optical, infrared, or multispectral cameras. In some embodiments, the cameras will send images (e.g., static images or video images) in real-time to a local monitoring and control system (e.g., the analysis system 296). Such a system may be provided as a computer or other hardware that includes software that will process the captured image in real-time, and then provide burning analysis and information to an operator. In some embodiments, the analysis system 296 or other monitoring system includes a computer that includes image (e.g., video) processing intelligence and is external to a camera 292. In such cases, the computer may connect to the camera via its Internet Protocol (IP) address. In other instances, the data acquisition components of a camera 292 can be connected directly (e.g., with an Ethernet cable) to an embedded computer, within or at the camera, having the image processing intelligence. The embedded computer can communicate with one or more other computers through wired or wireless connections. Still further, rather than streaming video frames from the camera 292 to an external computer, in one embodiment the embedded computer can process the acquired image data and communicate statistics of the image data to the external computer to reduce the amount of data transmitted over a network to the external computer.

Figure 12:
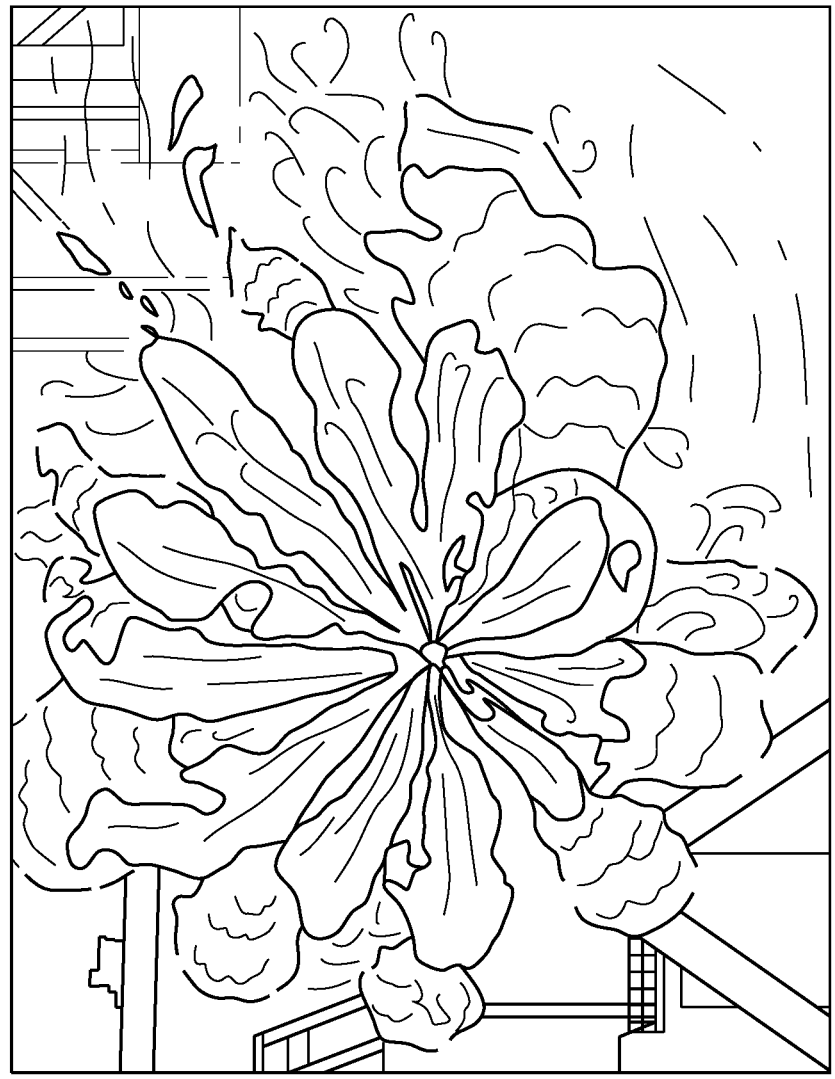
FIG. 12 represents a captured image at a point in time of a burner flame according to an embodiment of the present disclosure.

FIG. 12 represents a captured image of flame emanating from a burner (e.g., the burner 282) during a burning operation. In some embodiments, the software will inform operators in real-time whether potential issues or risks are detected from the image data during the burning operation. The images (e.g., infrared or optical images) can be analyzed in real-time and processed to be able to detect combustion and flame features, which may be divided in various categories. For example, the categories may include smoke detection, real-time detection of burner flame change, and burner flame calorimetric segmentation. The images may be processed and analyzed according to other categories as well. The presence of smoke provides direct information about the burner combustion, as do changes in the flame and color segmentation. Analysis of these categories can provide real-time information about burner combustion efficiency to field operators. Further, the burner efficiency information can be available to operators regardless of the weather, the environment, and the time of day. And in at least some instances, the software may also be able to make decisions and directly control a burning operation in real-time.

Smoke Detection

Figure 13:
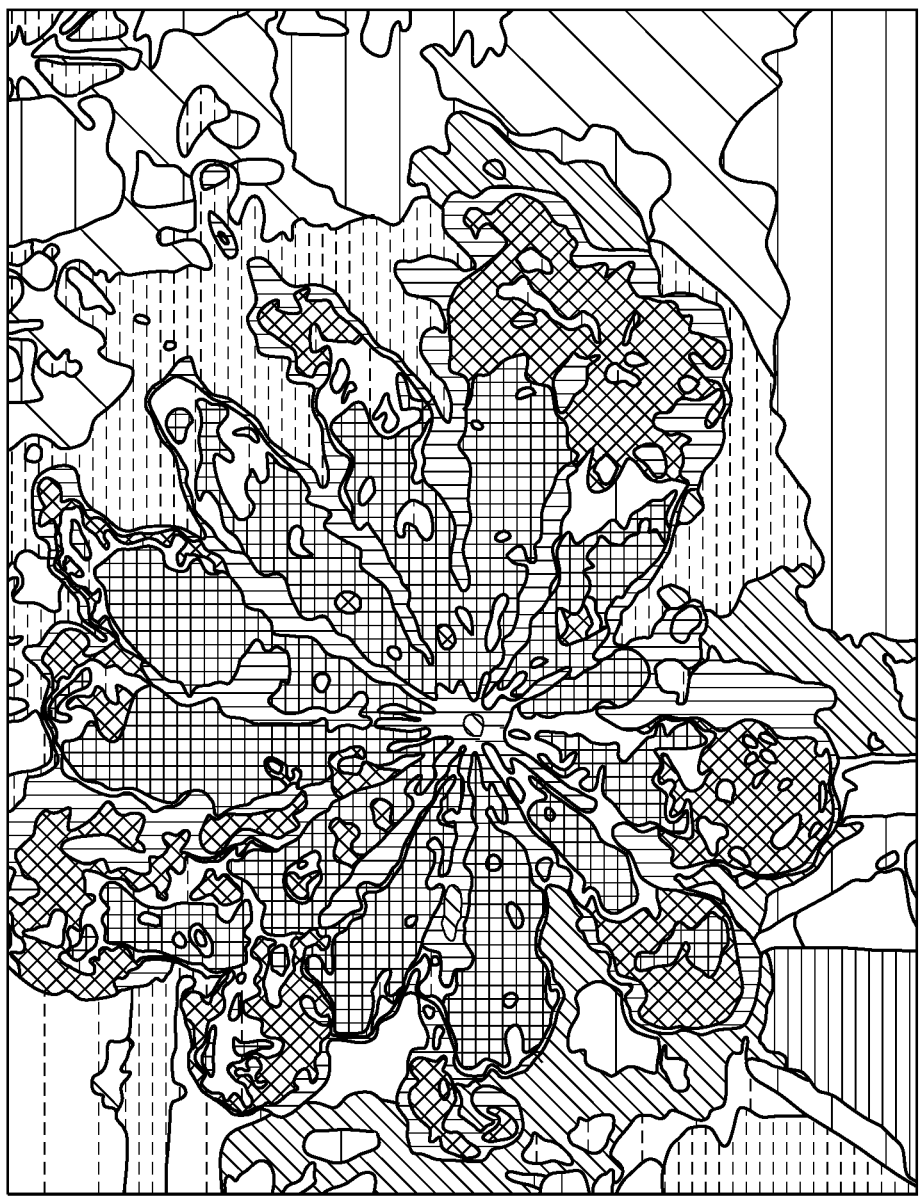
FIGS. 13-15 represent processed captured images according to some embodiments of the present disclosure.
Figure 14:
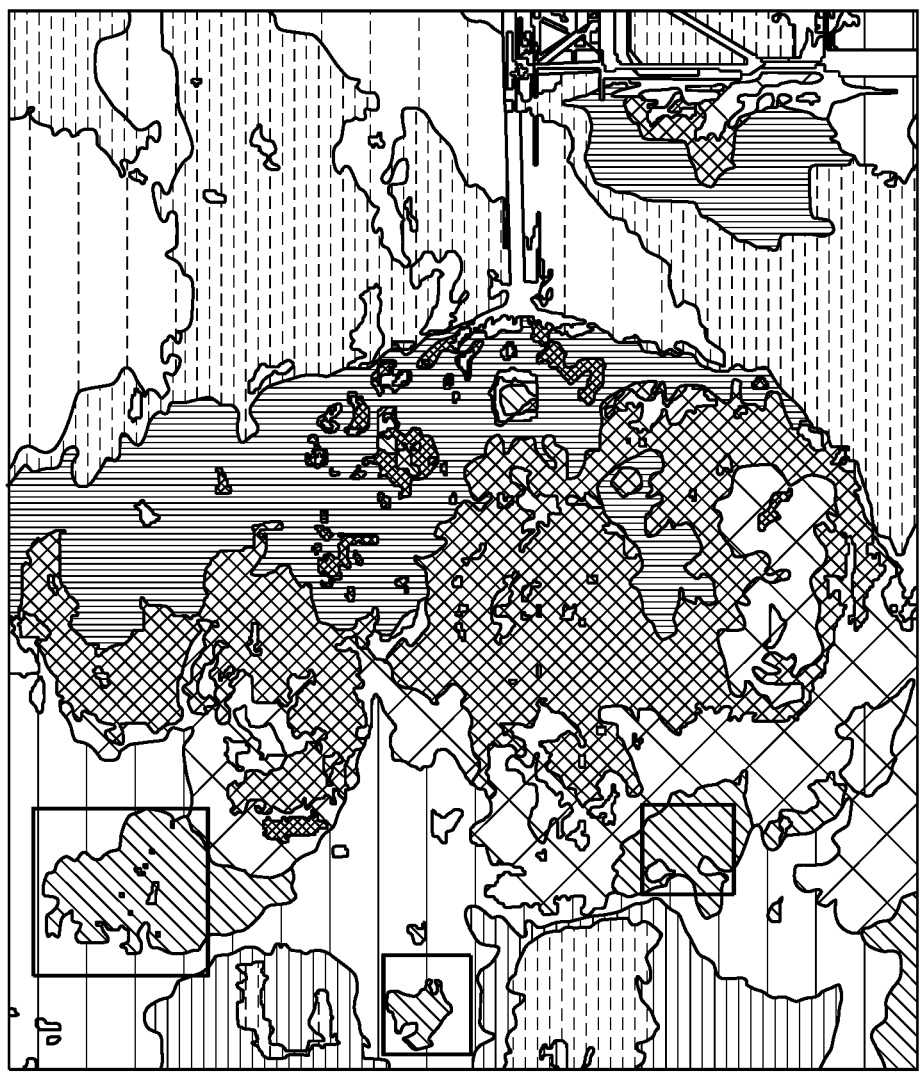

The systems and methods can include a smoke detection real-time processing, which is able to directly detect the presence of smoke around the burner. FIGS. 13 and 14 represent captured front (FIG. 13) and side (FIG. 14) images of the burner flame that have been processed to detect smoke. This detection may include not just the presence and type of smoke, but also the amount of smoke. FIG. 13 generally represents an enhanced view of the sections of the image that have smoke. The rectangular boxes in FIG. 14 surround portions of the captured image that have the same or similar type of smoke, which data may be further processed and analyzed to provide a health status of the burner and the combustion process.

Analyzing and processing the captured images also enables the determination of the kind of smoke present in the image, such as black smoke, white smoke, or variations in between, or even other colors, for instance. In one approach, the camera or cameras are focused on a zone around the flame during the setting-up phase that focuses on the flame and what is just around the flame. The images from this zone (e.g., optical images) will then be processed and analyzed, such as shown in FIGS. 13 and 14.

For example, in one method, the pixels in the image that indicate the presence of the flame are removed using a flame presence/absence process. The processed image thereby enhances the portions (pixels) of the image that include smoke. A segmentation of the remaining pixels is then performed. Smoke is then detected according to a mean variance. If smoke is detected, then the number of pixels having smoke is determined. Next, if the number or percentage of pixels having smoke is higher than a pre-determined threshold, for example 20%, an alarm signal is activated to notify the operators, such as by providing visual or audio output to computer system 208 or mobile device 214. In some instances, multiple thresholds may be used for different colors of smoke, such as a white smoke threshold and a black smoke threshold.

A machine learning algorithm may analyze the collected data to improve the model with which a captured image is compared and then improve the accuracy of a desired threshold value. The monitoring system then can provide warnings to personnel working at the well test site. For example, if the black smoke threshold is surpassed, that may indicate the presence of noxious gases and fumes in the air. White smoke passing a selected white smoke threshold may indicate that too much water is being sent to the burner and more diesel or other combustion-enhancing fluid should be sent to the burner along with the effluent to be burned.

Flame Size

Figure 15:
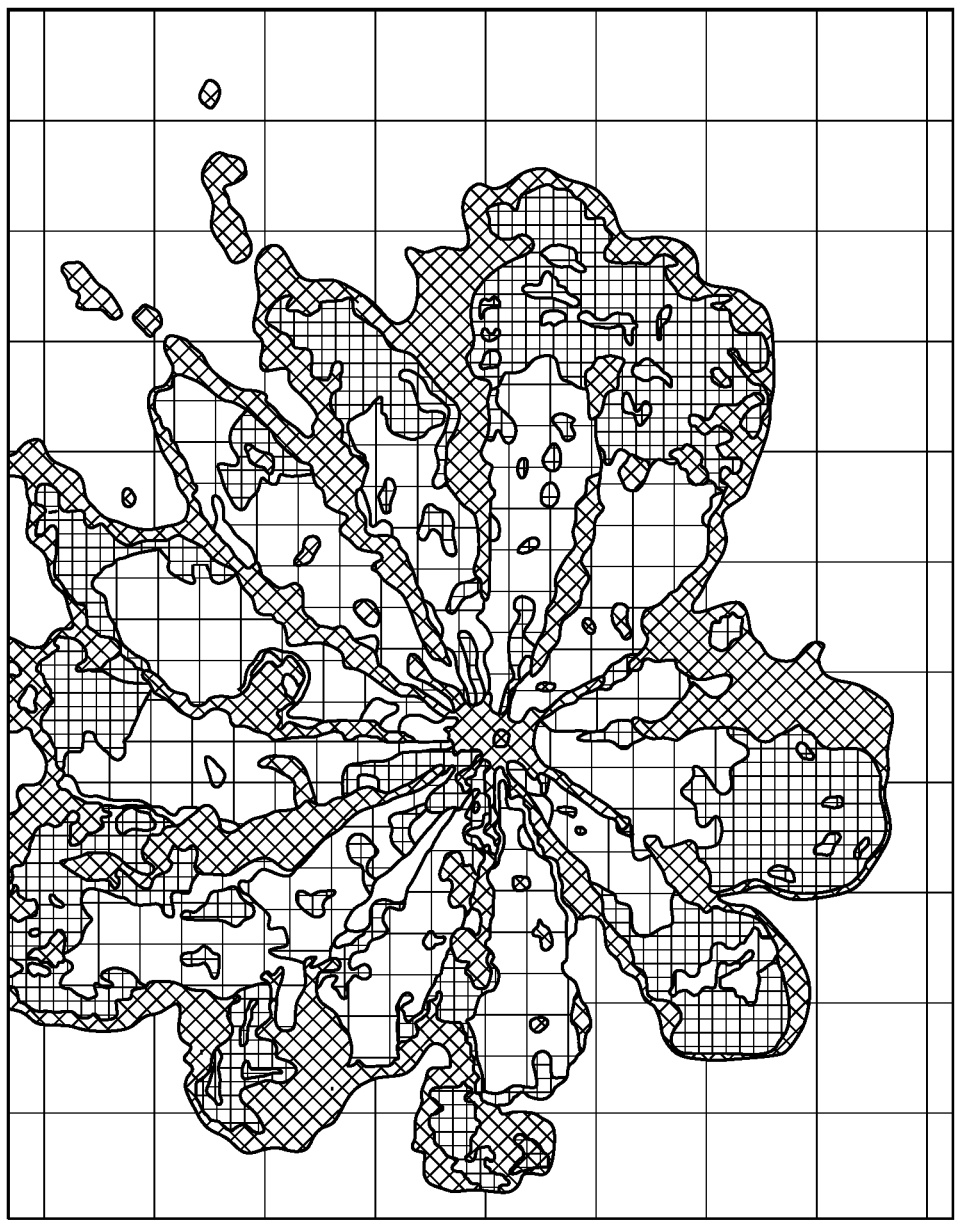

In some embodiments, the monitoring system may detect two types of flame size in real-time. For example, an analysis of a two-dimensional (2D) image can be performed that isolates the flame from the remaining pixels in the image. The area (size, number, etc.) of pixels having a flame can then be determined, and a series of images so processed can be compared in real-time to indicate increasing or decreasing flame size and shape. FIG. 15 represents a captured image processed to highlight the pixels of the image that indicate the presence of a flame.

More specifically, in one embodiment the presence of flame in a pixel image can be determined by taking the red channel of the image and applying an Otsu algorithm on the red image channel to binarize it. The mean of the pixels' values for the two classes can then be determined, and the class with the maximum mean can be compared with a threshold value. If the threshold value is met, the number of pixels having a flame is determined. If the number of pixels minus the number of reference pixels is less than an error threshold, the flame is considered good. If not, however, an alarm is activated and sent by the system to notify the operators. The selected threshold value may be determined by obtaining a set of images having the flame and computing the mean and the variance of the flame size and shape for the whole set. If the flame is not considered good, insufficient combustion may be occurring, resulting in oil droplets falling to the surrounding environment. Thus, a "flame size alarm" may be output to an operator to indicate an imminent oil spill. Control software may then be used to automatically turn off the effluent flow valve in response to the detection of undesirable flame characteristics so that no oil or gas is sent to the burner. In some embodiments, when a "flame size alarm" is indicated, the control software may alter the flow rate of effluent, of oxygen or other gas mixture for combustion, or of any other combustion-enhancing fluid, such as diesel, that is mixed with the effluent in order to promote combustion.

Although described above in the context of 2D image analysis, it will also be appreciated that such processing to determine the size of the flame may also or instead be performed in three dimensions (3D) for volumetric representation of the flame. This processing may be applied using two or more cameras 292 to monitor the burner 282. Such embodiments can be based on stereo vision techniques and can include processing image data from the cameras to provide a 3D representation of the flames, as well as the 3D volume of the flames.

Flame Colorimetric or Color Segmentation

Figure 16:
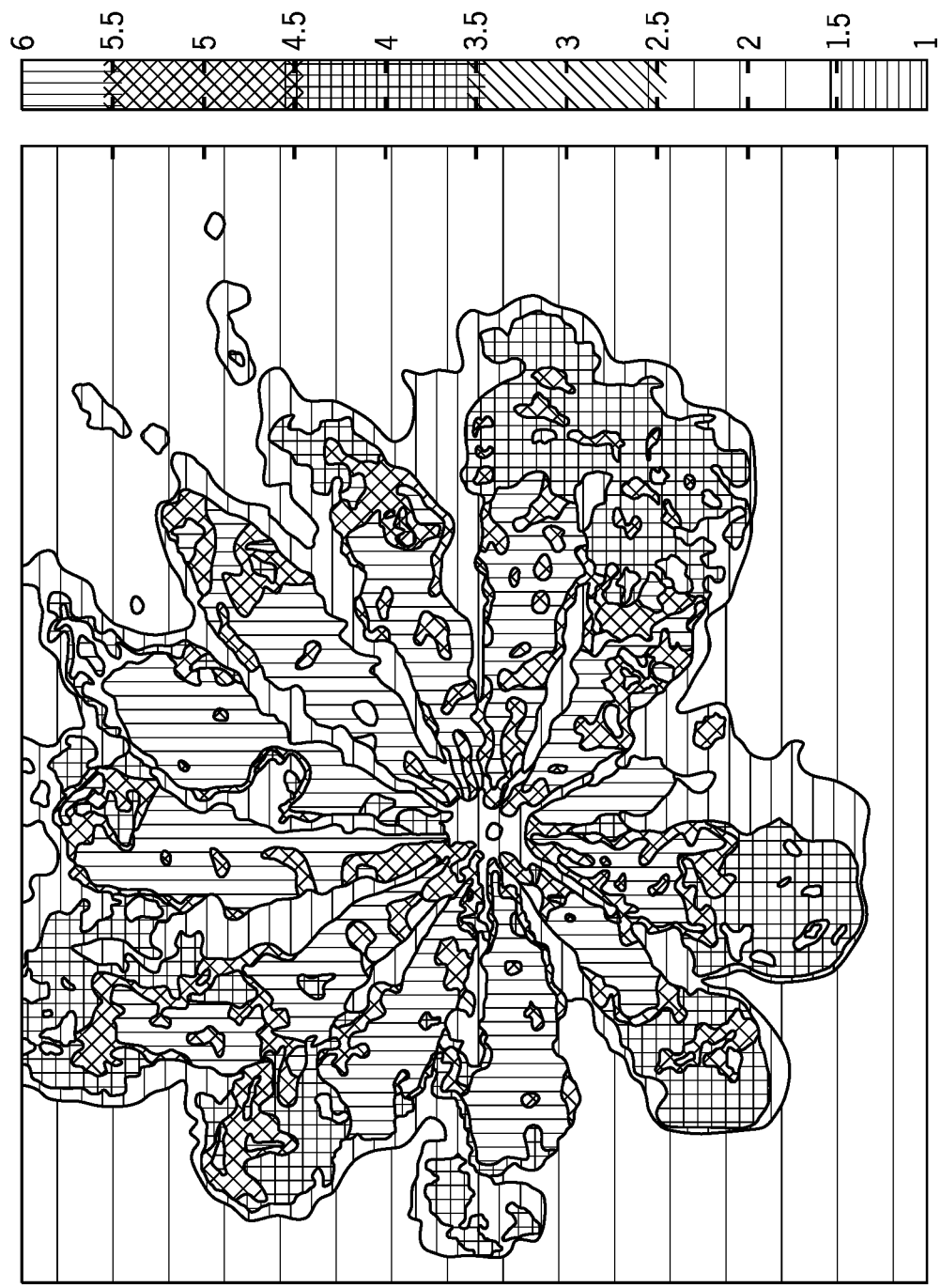
FIG. 16 depicts a color class profile of the image shown in FIG. 15, with the profile indicative of temperature of different portions of the flame, according to an embodiment of the present disclosure.

This category for analysis enables classification of flame texture in order to detect at least two kinds of flame colorimetric or color class profiles. Those results can then be correlated with a temperature profile where each colorimetric or color class profile is associated to a temperature. FIG. 16 represents processing of the image captured in FIG. 15 to provide a colorimetric or color class profile indicating various temperatures of different portions of the flame.

Figure 17:
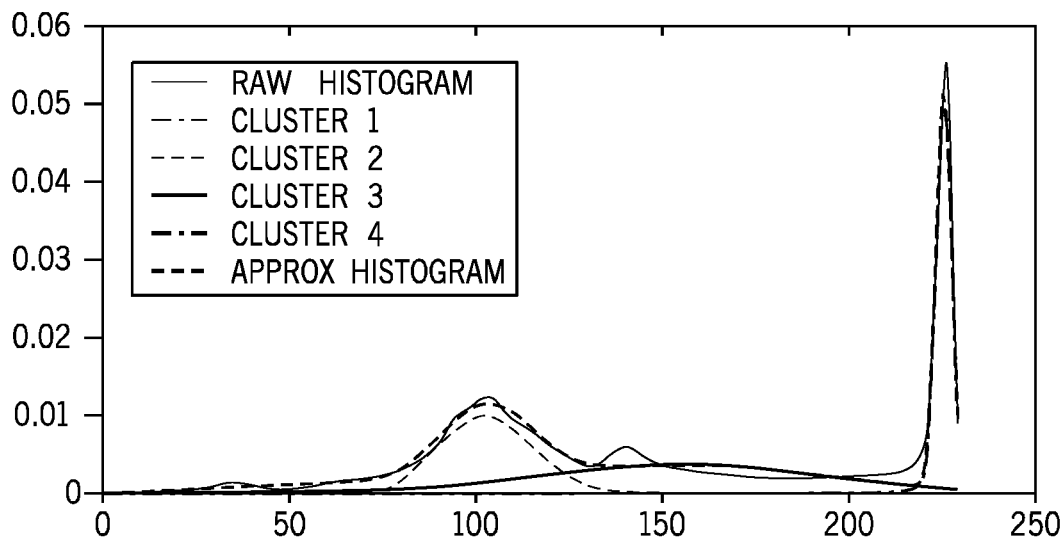
FIG. 17 is a histogram of pixel intensities of an image of the burner flame in accordance with an embodiment of the present disclosure.

This may be done by binarizing the image using the same or similar methods previously discussed for detecting the presence of flames. In some embodiments, this technique includes applying a clustering algorithm, like spectral clustering defining at least three classes, or Markov modeling. Each class is then returned in an image showing the color map of the flame. The output will be the mean and the variance for each class. Thus, an analyzed and processed captured image will provide the pixel intensity which may correspond to temperature. A histogram of measured pixel intensities is generally provided in FIG. 17 as an example.

Figure 18:
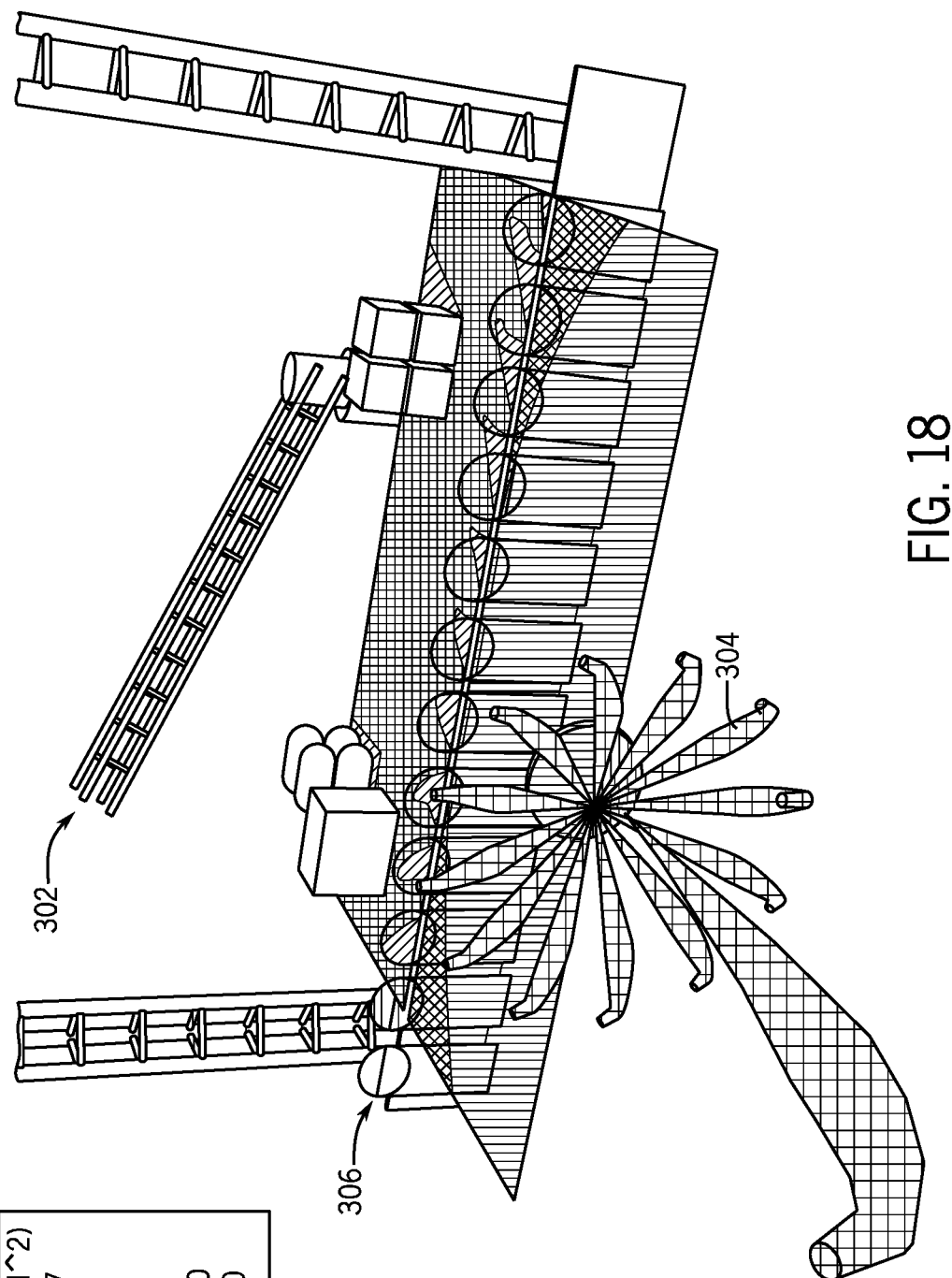
FIG. 18 shows a schematic diagram of modeling the temperature at a well test site due to radiant heat from a burner in accordance with an embodiment of the present disclosure.

FIG. 18 shows a schematic diagram of modeling the temperature at a well test site 302 due to radiant heat from flame 304 of a burner. FIG. 19 shows a top view of the schematic diagram shown in FIG. 18. The analysis system 296 (or some other monitoring system) can be programmed with modeling software that may be used to calculate the heat radiation from a burner over an adjacent area, such as the well test site where other well test equipment and operators are located. The schematic diagram also shows a water screen 306 placed between the burner and the well test site to provide a heat shield during a burning operation.

The heat radiated to the surrounding environment will change in location and intensity due to changes in the burner combustion, such as changes in environmental conditions (e.g., wind direction and speed) and burning process conditions (e.g., pressures, temperatures, and flow rates to the burner of effluent, oxygen, diesel fuel, or other gases and liquids that are burned). As the burner monitoring system analyzes and processes the captured images to provide flame size, temperature, etc., it can send that information to the radiant heat simulation software to calculate in real-time the changes in temperature at the well test site, such as an off-shore rig. The water screen 306 then may be automatically controlled and repositioned based on the updated heat simulation to provide greater safety at the well test site for both equipment and personnel.

Additionally, some embodiments include a burning control system for controlling a burning operation based on analysis of image data, such as through the analysis techniques described above. In some instances, the analysis system 296 serves as the burning control system, but a separate control system could be provided. The burning control systems of various embodiments can allow remote, semi-automatic, or complete automation of a control process, in which an operator or the control system controls a burning operation based on quantitative and qualitative data from images acquired via the one or more cameras 292.

A set of parameters allows one or more action thresholds for burning characteristics to be set and adjusted to the current environmental conditions (e.g., wind direction and speed) and burning process variations or conditions (e.g., pressures, temperatures, flow rates of various fluids to the burner, and water screen obstructions). Non-limiting examples of action thresholds include a black smoke threshold, a white smoke threshold, a flame size threshold, or a flame temperature threshold. By having a relative basis for comparison, the system would allow the decision process also to be based on process variation and eventual degradation of conditions.

More specifically, in at least one embodiment burning parameters are evaluated through various techniques described above. The initial burning parameters of the system may include the following image aspects: size of the flare in length and width, temperature of the flame, flame development point, and variations from a previous instantaneous condition. The initial set-up can be based on a pre-flow flare test, which is often done with diesel or base oil.

From this initial set-up, geometrical interferences and distortion could be adjusted and set as reference images. An analysis system 296 could then have that specific use scenario incorporated into a database of allowable cases. On top of this, preliminary loaded data based on real, processed images would allow the user to select pre-set scenarios for different job conditions (e.g., normal operation, flame degradation, and flame out). The combination of database information (such as from preliminary engineering studies) and a current job condition (status) would allow the system to generate output. The nature of the system output could vary depending on the detected job condition. In a detected degradation scenario, for example, the system could generate an alarm for an operator, while detection of a sudden flame out could immediately generate a shutdown of the burning operation.

In some instances, the system can be integrated with flow control equipment (e.g., a burner control manifold or a reflux manifold) to initiate two levels of automatic reaction in response to an undesirable burning condition. More specifically, the control system can implement a first level of control in an effort to return the burning operation to an acceptable condition, such as by changing a flow rate of combustion-enhancing fluid to the burner or otherwise controlling the quality of effluent being sent to the burner. If the first control action taken by the system does not return the burning operation to an acceptable condition, a second level of control may be implemented by the system, such as ceasing a burning operation by re-routing the effluent to a tank. In instances of manual control, the control system may provide alerts or suggestions to operators, who may themselves take action to improve or cease a burning operation. Whether control of the burning operation is performed automatically or manually, burning characteristics identified through analysis of image data for the flame of the burner facilitate such control. In at least some embodiments, further incorporation of other process data, such as inline density, valve position, pressure, temperature, or inline basic sediments and water (BSW) measurements, permit the system to act with interlocks in regard to other process variations.

Figure 20:
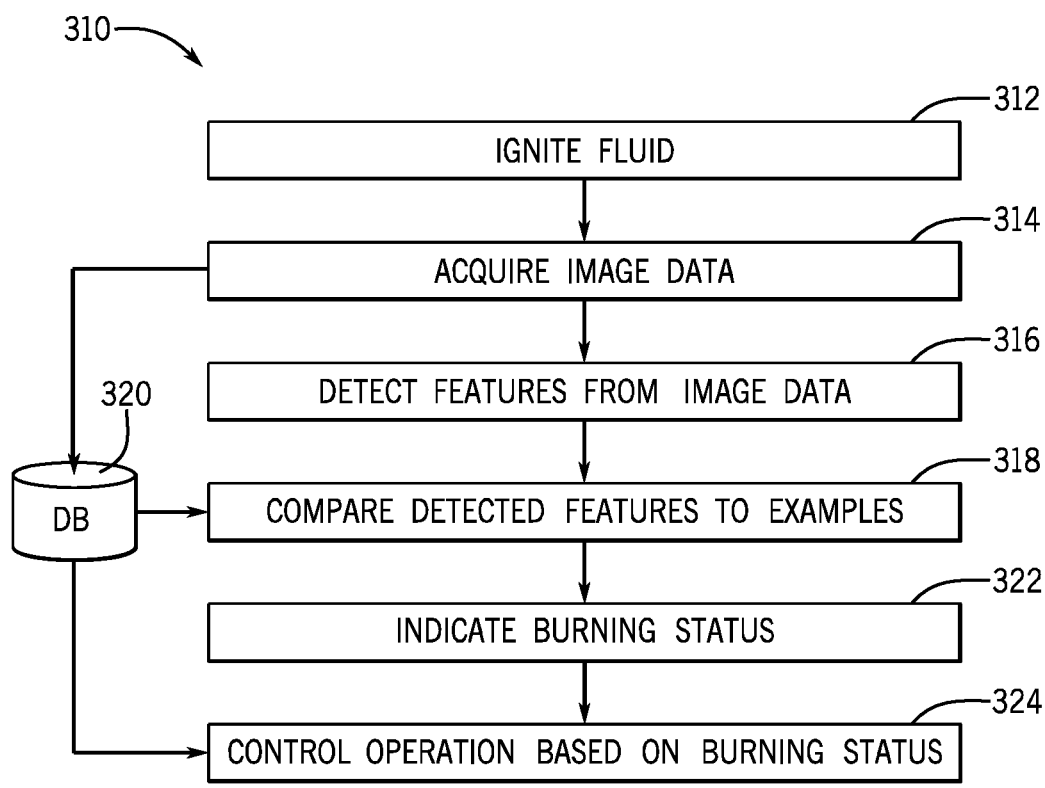
FIG. 20 is a flowchart representing a process for monitoring a burning operation in accordance with an embodiment of the present disclosure.

Lastly, an example of a method for monitoring a burning operation is generally represented by flowchart 310 in FIG. 20. In this embodiment, fluid is ignited (block 312) and image data indicative of the combustion of the fluid is acquired (block 314). From the foregoing description, it will be appreciated that the ignited fluid could include a well effluent having oil or gas routed to a burner 282 and that the image data can be acquired with one or more cameras 292. The method also includes detecting (block 316) features in the acquired image data, such as through the techniques described above, and comparing (block 318) the detected features to examples (e.g., reference images) or thresholds, which may be stored in a database 320. The status of a burning operation (e.g., normal operation, flame degradation, or flame out) can be determined from the comparison and, in at least some instances, an indication of the status is provided to an operator (block 322). The burning operation may then be controlled based on the identified burning status (block 324), such as described above. Machine learning may be used to train and refine operation of the burner monitoring and control functionalities described herein. By way of example, unsupervised machine learning may facilitate feature identification using information from past scenarios (e.g., alarms, state of operation at time of alarm, and how problem was solved) and may enable detection of hidden features in acquired image data.

The foregoing outlines features of several embodiments so that those skilled in the art may better understand aspects of the present disclosure. Those skilled in the art should appreciate that they may readily use the present disclosure as a basis for designing or modifying other processes and structures for carrying out the same purposes or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

The invention claimed is:

1. A method comprising:
   igniting oil or gas with a burner during a burning operation;
   monitoring the burning operation with a camera, wherein monitoring the burning operation includes:
      acquiring image data for a flame of the burner via the camera;
      analyzing the acquired image data to detect image features indicative of combustion of the oil or gas via the burner;
      controlling the burning operation to alter combustion of the oil or gas based on the detected image features indicative of combustion of the oil or gas; and
      monitoring and controlling the burner at a wellsite with a well testing apparatus deployed at the wellsite, the well testing apparatus being coupled to wellhead equipment installed at a well and comprising the burner.

2. The method of claim 1, wherein controlling the burning operation
   to alter combustion of the oil or gas based on the detected image features indicative of combustion of the oil or gas includes changing a flow rate of a combustion-enhancing fluid to the burner or operating a flow valve to change flow of the oil or gas to the burner.

3. The method of claim 1, wherein controlling the burning operation
   to alter combustion of the oil or gas includes automatically controlling the burning operation to
   alter combustion of the oil or gas based on the detected image features indicative of combustion of the oil or gas.

4. The method of claim 1, wherein analyzing the acquired image data to detect image features includes comparing the acquired image data to previously acquired image data to identify changes in combustion of the oil or gas during the burning operation.

5. The method of claim 4, wherein the previously acquired image data includes reference images acquired during a flare test of the burner before the burning operation.

6. The method of claim 1, comprising:
   detecting a first burning operation condition based on the detected image features;

initiating a first response to the detection of the first burning operation condition;

detecting a second burning operation condition, different from the first burning operation condition, based on the detected image features; and initiating a second response, different from the first response, to the detection of the second burning operation condition.

7. The method of claim 1, wherein analyzing the acquired image data to detect image features indicative of combustion of the oil or gas via the burner includes analyzing the acquired image data to detect smoke resulting from the combustion of the oil or gas via the burner.

8. The method of claim 7, comprising:
determining a number of pixels in the acquired image data that are indicative of smoke;
comparing the determined number of pixels indicative of smoke to a threshold; and
activating an alarm signal based on the comparison of the determined number of pixels indicative of smoke to the threshold.

9. The method of claim 8, wherein determining the number of pixels in the acquired image data that are indicative of smoke and comparing the determined number of pixels to the threshold are performed via a model, and the method comprises using machine learning to refine the model.

10. The method of claim 1, wherein analyzing the acquired image data to detect image features indicative of combustion of the oil or gas via the burner includes analyzing the acquired image data to determine size of the flame or to segment the acquired image data by color.

11. The method of claim 1, comprising providing real-time information about burner combustion efficiency to an operator based on the analysis of the acquired image data.

12. The method of claim 1, comprising providing real-time information identifying a type of hydrocarbon burned during the burning operation based on the analysis of the acquired image data.

13. The method of claim 1, comprising providing real-time information about process variations or heat radiation during the burning operation based on the analysis of the acquired image data.

14. A system comprising:
a wellsite apparatus including:
a separator configured to receive a multiphase fluid;
a burner coupled downstream from the separator for burning oil or gas of the multiphase fluid;
a camera positioned to acquire image data for a flame of the burner, the image data indicative of operation of the burner during burning of oil or gas, wherein the wellsite apparatus is deployed at a wellsite, the wellsite apparatus being coupled to wellhead equipment installed at a well and comprising the burner; and
an analysis system configured to analyze operation of the burner based on the image data acquired with the camera, wherein the analysis system is configured to control operation of the burner based on the analysis of the operation of the burner by the analysis system.

15. The system of claim 14, wherein the wellsite apparatus includes a well control assembly coupled upstream of the separator so as to route the multiphase fluid from a well to the separator and a fluid management assembly coupled downstream of the separator so as to receive separated fluids from the separator, and wherein the analysis system is configured to control operation of the burner by controlling a valve of the well control assembly or of the fluid management assembly.

16. The system of claim 14, comprising a water screen deployed between the separator and the burner.

17. The system of claim 16, wherein the analysis system is configured to control the water screen based on the analysis of the operation of the burner by the analysis system.

18. The system of claim 14, wherein the camera includes an optical camera positioned to acquire optical image data or an infrared camera positioned to acquire infrared image data.

* * * * *